United States Patent
Gregori et al.

(10) Patent No.: US 7,679,301 B2
(45) Date of Patent: Mar. 16, 2010

(54) MOVABLE BARRIER OPERATOR AUTO-FORCE SETTING METHOD AND APPARATUS

(75) Inventors: Eric M. Gregori, Lindenhurst, IL (US); James J. Fitzgibbon, Batavia, IL (US); Carlos Jurado, Aurora, IL (US); Robert R. Keller, Jr., Chicago, IL (US); Matthew C. Stephan, Glen Ellyn, IL (US); Colin Willmott, Buffalo Grove, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 12/040,574

(22) Filed: Feb. 29, 2008

(65) Prior Publication Data

US 2008/0180050 A1 Jul. 31, 2008

Related U.S. Application Data

(62) Division of application No. 10/971,303, filed on Oct. 22, 2004, now Pat. No. 7,339,336, which is a division of application No. 10/335,199, filed on Dec. 31, 2002, now Pat. No. 6,870,334.

(51) Int. Cl.
*H02P 1/00* (2006.01)
*H02K 7/10* (2006.01)
*G05B 5/01* (2006.01)

(52) U.S. Cl. ............... 318/282; 318/286; 318/466; 318/468; 318/471; 318/432; 49/28; 49/31

(58) Field of Classification Search ............ 318/466, 318/468, 471, 432, 264–266, 280–286, 600–603, 318/544, 626; 49/24–28, 31, 32; 160/293.1, 160/1, 310

See application file for complete search history.

(56) References Cited

U.S. PATENT DOCUMENTS 4,625,291 A 11/1986 Hormann (Continued)

FOREIGN PATENT DOCUMENTS

DE 3921158 A1 1/1991

(Continued)

OTHER PUBLICATIONS

"Force Regulations." 2 pp. Berner Torantriebe Oct. 17, 2002. <http://www.bernertorantriebe.co/HomeE/Warum_BernerE/KraftregulierungE/kraftregulierunge.html>.

(Continued)

*Primary Examiner*—Walter Benson
*Assistant Examiner*—Eduardo Colon
(74) *Attorney, Agent, or Firm*—Fitch Even Tabin & Flannery

(57) ABSTRACT

A movable barrier operator having a motor controller (10) and motor (11) that control selective movement of a movable barrier (12) also has an obstacle detector (14) that utilizes an automatically determined excess force threshold value to permit reliable detection of an obstacle under a wide variety of operational circumstances, including changing physical circumstances, aging components, temperature variations, and motor runtime. In a preferred embodiment, a characteristic force value for the system is frequently updated as a function of actual measured force requirements (and further compensated, pursuant to various embodiments, with respect to other conditions such as temperature and motor runtime). This characteristic force value is then utilized to determine the excess force threshold value.

25 Claims, 15 Drawing Sheets

U.S. PATENT DOCUMENTS

| | | | |
|---|---|---|---|
| 4,638,433 A | | 1/1987 | Schindler |
| 4,701,684 A | | 10/1987 | Seidel et al. |
| 4,746,845 A | | 5/1988 | Mizuta et al. |
| 4,831,509 A | | 5/1989 | Jones et al. |
| 4,959,598 A | | 9/1990 | Yoshida et al. |
| 5,278,480 A | | 1/1994 | Murray |
| 5,285,136 A | | 2/1994 | Duhame |
| 5,486,747 A | | 1/1996 | Welch |
| 5,770,934 A | | 6/1998 | Theile |
| 5,821,644 A | | 10/1998 | Sommer |
| 5,925,996 A | | 7/1999 | Murray |
| 5,929,580 A | | 7/1999 | Mullet et al. |
| 5,932,931 A | | 8/1999 | Tanaka et al. |
| 5,950,364 A | | 9/1999 | Hormann |
| 6,097,166 A | * | 8/2000 | Fitzgibbon et al. .......... 318/471 |
| 6,107,765 A | | 8/2000 | Fitzgibbon et al. |
| 6,111,374 A | | 8/2000 | Fitzgibbon et al. |
| 6,118,243 A | | 9/2000 | Reed et al. |
| 6,161,438 A | * | 12/2000 | Mullet et al. .................. 73/774 |
| 6,208,101 B1 | | 3/2001 | Seeberger et al. |
| 6,340,872 B1 | | 1/2002 | Fitzgibbon et al. |
| 6,566,828 B2 | | 5/2003 | Fitzgibbon et al. |
| 6,605,910 B2 | | 8/2003 | Mullet et al. |
| 6,667,591 B2 | | 12/2003 | Mullet et al. |
| 6,806,665 B2 | | 10/2004 | Fitzgibbon et al. |
| 6,870,334 B2 | | 3/2005 | Jurado et al. |
| 6,873,127 B2 | | 3/2005 | Murray |
| 6,897,630 B2 | * | 5/2005 | Murray et al. ............... 318/434 |
| 7,019,478 B2 | | 3/2006 | Gregori et al. |
| 7,034,486 B1 | * | 4/2006 | McMahon |
| 7,034,487 B1 | | 4/2006 | Murphy et al. |
| 7,154,377 B2 | * | 12/2006 | Gregori ...................... 340/5.7 |
| 7,173,516 B2 | | 2/2007 | Mullet et al. |
| 7,339,336 B2 | | 3/2008 | Gregori |
| 7,436,141 B2 | * | 10/2008 | Perez et al. ................. 318/466 |
| 2003/0189415 A1 | | 10/2003 | Fitzgibbon |
| 2003/0193304 A1 | | 10/2003 | Fitzgibbon |
| 2003/0210005 A1 | | 11/2003 | Murray |
| 2004/0032232 A1 | | 2/2004 | Murray et al. |
| 2004/0239269 A1 | | 12/2004 | Fitzgibbon et al. |
| 2005/0022451 A1 | | 2/2005 | Fitzgibbon et al. |
| 2005/0146298 A1 | | 7/2005 | Murray |
| 2005/0256718 A1 | | 11/2005 | Robb et al. |
| 2005/0269984 A1 | | 12/2005 | Piechowiak et al. |
| 2007/0001637 A1 | | 1/2007 | Murphy et al. |

FOREIGN PATENT DOCUMENTS

| | | |
|---|---|---|
| DE | 19627238 A1 | 1/1998 |
| DE | 19810077 A | 9/1998 |
| FR | 2744483 A | 8/1996 |
| GB | 2 232 255 | 12/1990 |

OTHER PUBLICATIONS

British Search Report for British patent application GB0400158.2 dated Sep. 2, 2004.

* cited by examiner

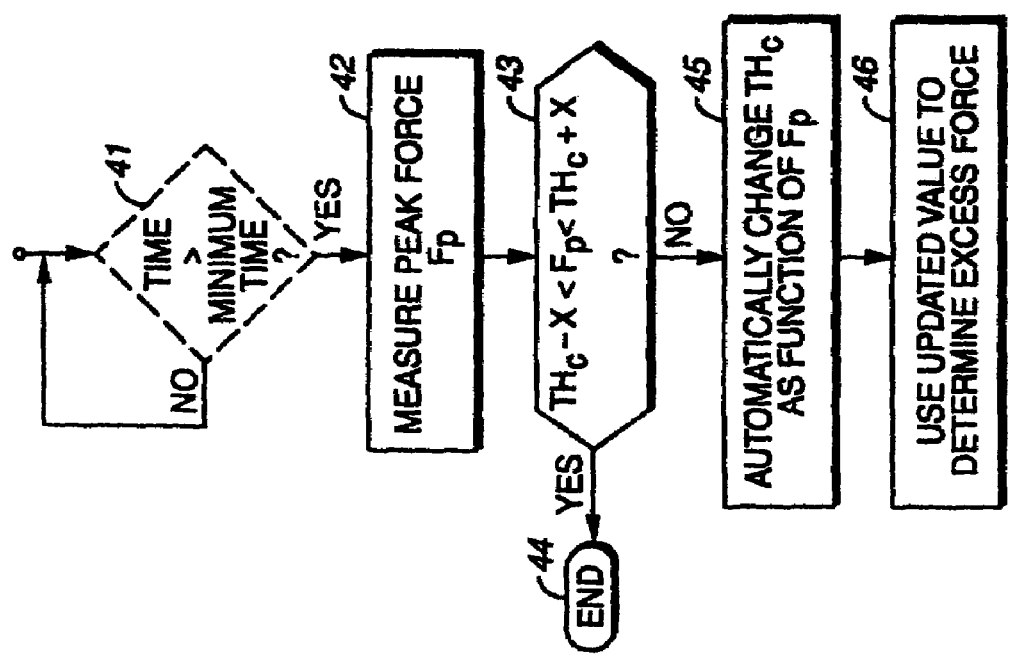
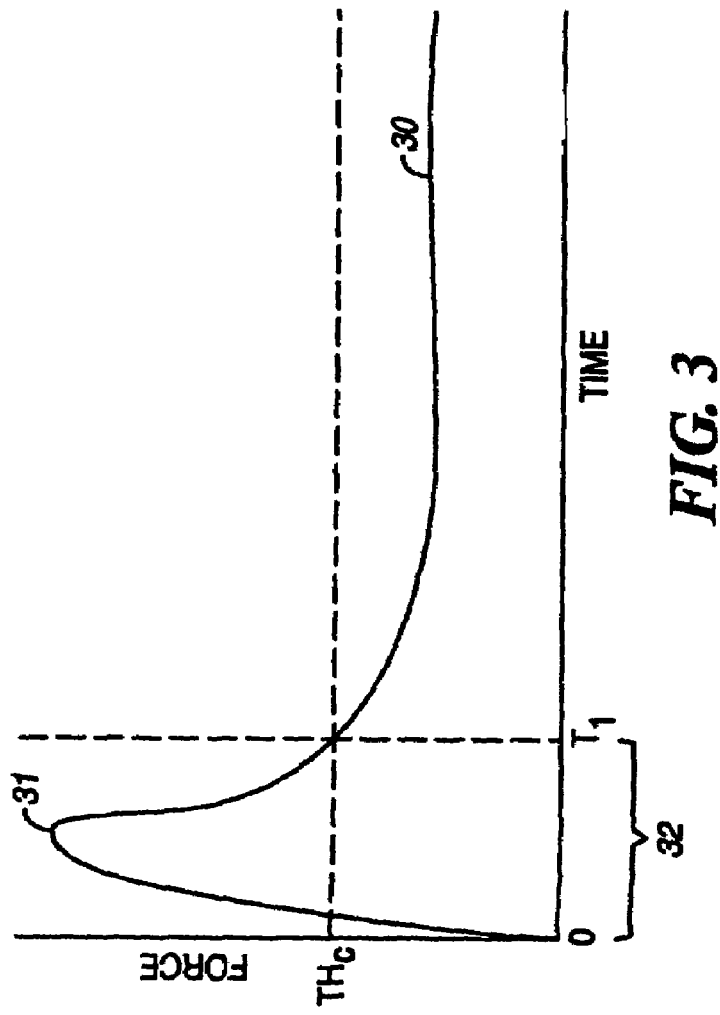
FIG. 4
FIG. 3

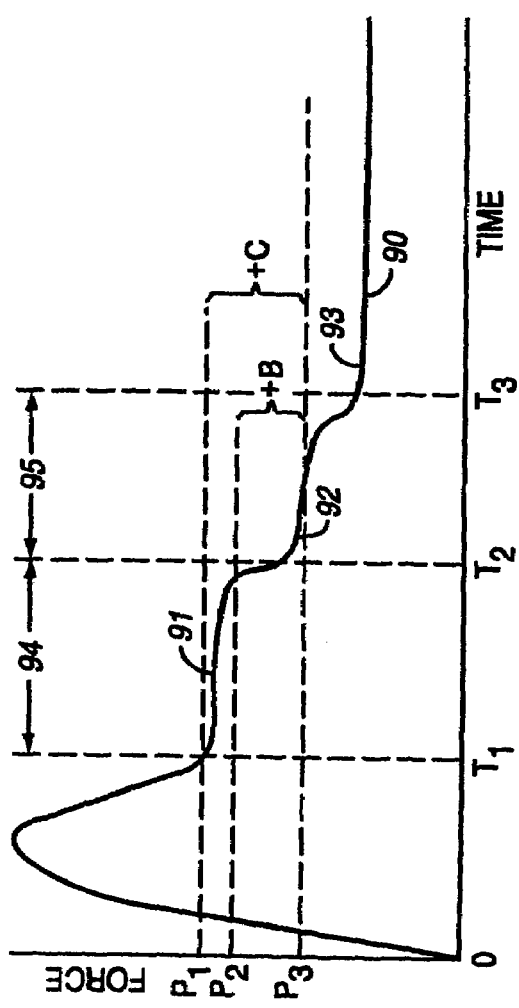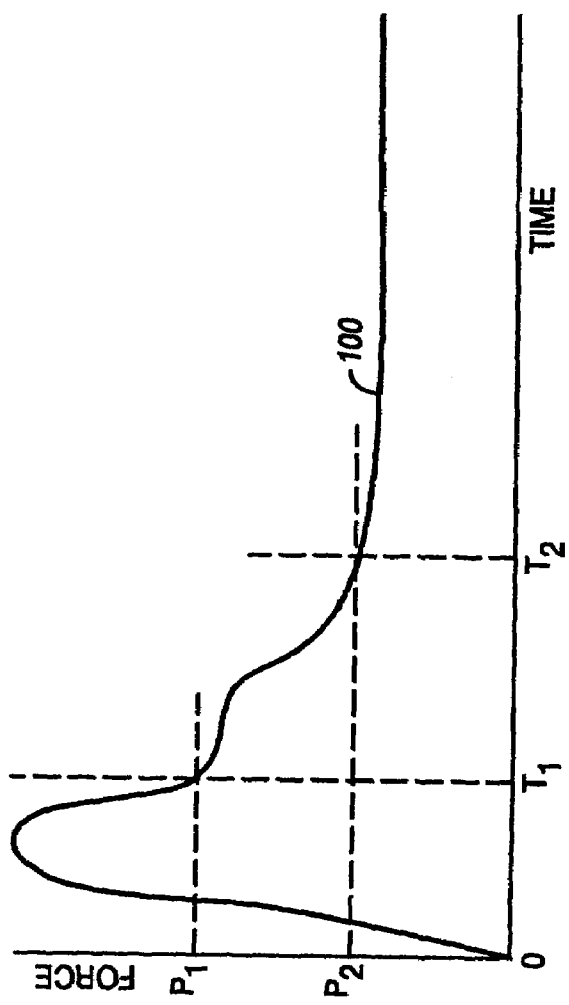

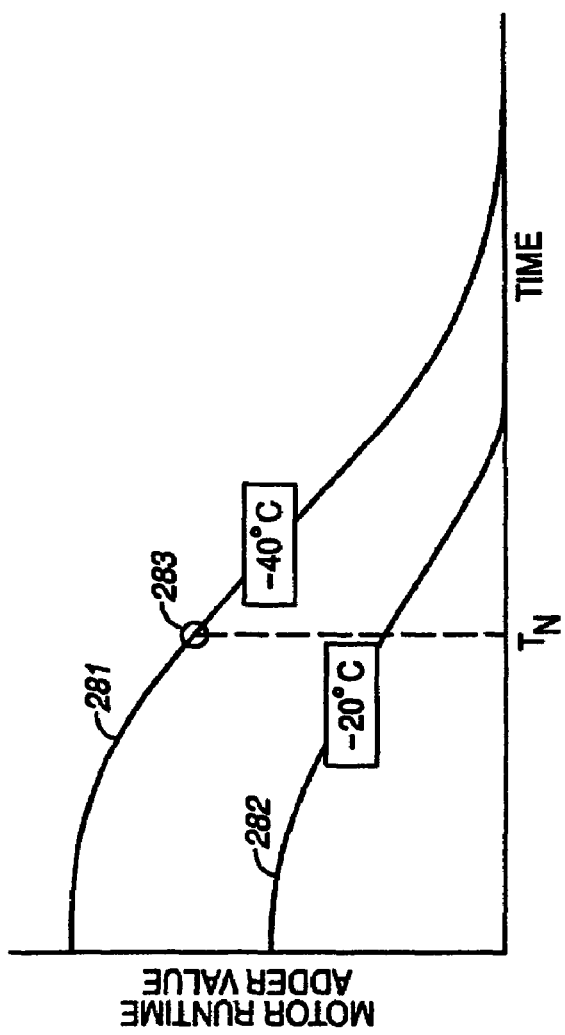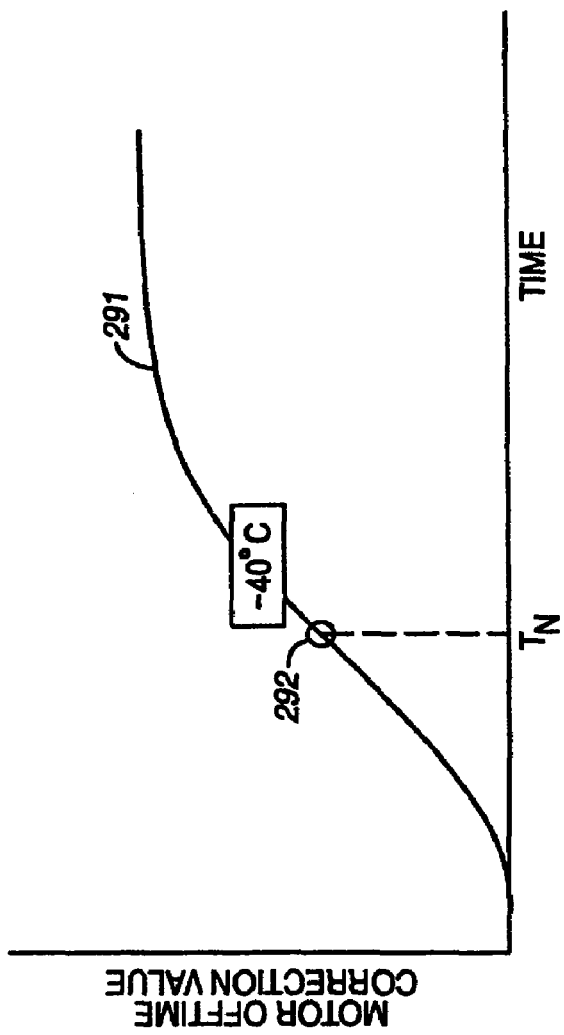

MOVABLE BARRIER OPERATOR AUTO-FORCE SETTING METHOD AND APPARATUS

CROSS REFERENCE TO RELATED APPLICATION

This is a division of prior application Ser. No. 10/335,199, filed on Dec. 31, 2002, which is hereby incorporated herein by reference in its entirety.

TECHNICAL FIELD

This invention relates generally to movable barrier operators and more particularly to auto-force setting.

BACKGROUND

Many movable barrier operators monitor applied force (typically by monitoring a parameter that varies as a function of force) as corresponds to movement of a movable barrier and use such information to determine when the movable barrier has encountered an obstacle (such as a person or item of personal property). Upon sensing such an obstacle, the operator will typically initiate a predetermined action such as reversing the movement of the barrier. In particular, the operator usually compares present applied force against a threshold that represents excessive force to identify such an occurrence.

Unfortunately, a factory-set static excessive force threshold will typically not provide satisfactory results under all operating conditions and/or for all installations. The reasons are numerous and varied. The physical dimensions of a given installation can vary dramatically (both with respect to barrier travel distance and barrier weight as well as other manifest conditions) and these physical conditions can and will in turn impact the amount of force required to move the barrier. The physical interface between the barrier and its corresponding track or pathway can also vary, sometimes considerably, over the length of barrier travel. Such variations can each, in turn, be attended by significantly varying force requirements. Temperature, too, can have a significant impact on necessary force, as temperature (and especially colder temperatures) can alter the physical relationships noted above and can also significantly impact upon at least the initial operating characteristics of a motor as is used to move the barrier. Force needs, measurements, and/or behaviors can also vary with respect to time, as the physical conditions themselves change, as the motor ages, and even with respect to how long a motor has been recently operating.

To attempt to accommodate such circumstances, many movable barrier operators have a user-adjustment interface (usually one or two potentiometer-style knobs) that a user or installer can manipulate to adjust allowed applied force during one or more directions of barrier travel. Unfortunately, even when used correctly, force settings established in this way can become outdated. Another solution has been to provide a learning mode during which a movable barrier operator can monitor force conditions during movement of the barrier and use such information to automatically establish an excess-force threshold to be used during subsequent normal operations. Unfortunately, again, force setting values established in this way can become outdated (and sometimes within a short period of time).

BRIEF DESCRIPTION OF THE DRAWINGS

The above needs are at least partially met through provision of the movable barrier operator auto-force setting method and apparatus described in the following detailed description, particularly when studied in conjunction with the drawings, wherein:

FIG. 3 comprises a graph depicting illustrative force behavior;

FIG. 4 comprises a flow diagram illustrating detail in accordance with an embodiment of the invention;

FIG. 9 comprises a graph illustrating certain particulars as accord with an embodiment of the invention;

FIG. 10 comprises a graph illustrating certain particulars as accord with an embodiment of the invention;

FIG. 28 comprises a graph illustrating certain particulars as accord with an embodiment of the invention; and FIG. 29 comprises a graph illustrating certain particulars as accord with an embodiment of the invention.

Figure 2:
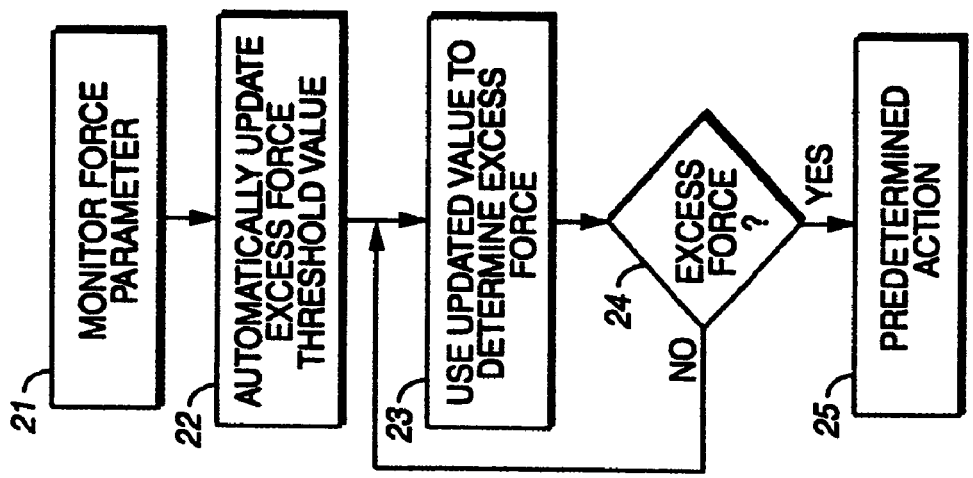
FIG. 2 comprises a flow diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, an automatic force-setting capability permits regular (or essentially constant) updating of one or more force thresholds that are used, for example, to detect an excess application of force as ordinarily associated with obstacle encounters. This capability exists compatibly with, or without, concurrent availability of an automatic force-setting learning mode of operation and/or user-manipulable force-setting controls.

In general, actual exerted force (typically as ascertained via monitoring of a corresponding parameter, such as motor current) informs the automatic updating/changing of the force-setting(s) value(s) (in general, for ease of presentation, only a single force-setting value or threshold will typically be mentioned herein with it being understood that such a reference includes both the singular and plurality of such values or thresholds). As actual exerted force increases or decreases over time and/or with circumstances (such as changing physical conditions and/or ambient temperature), the force-setting value can be similarly changed to aid in ensuring that the force-setting value remains relevant to present operating circumstances.

Such changes are effected in a variety of ways pursuant to these various embodiments. In one embodiment, no changes are made to a present force-setting value when a present force measurement is not sufficiently different from a present point of comparison. In another embodiment, the force-setting value is changed in substantially identical correlation to a given present force measurement (for example, by causing a characteristic force value that is used to determine an excess force-setting threshold to be rendered substantially equal to a present force measurement). Pursuant to yet another embodiment, such a characteristic force value (and/or a resultant excess force threshold) is altered in a step-fashion when, for example, a relatively significant gap exists between the characteristic force value and the present force measurement. So configured, an automatically determined force-setting value can track actual force changes while avoiding relatively pointless alterations and/or over-reacting to any particular anecdotal actual force measurement.

In various embodiments, a single force threshold can be automatically determined for an entire length of travel, or multiple thresholds can be similarly calculated for corresponding portions of the travel time when significant differing force behaviors are detected. In yet other embodiments, a changing threshold mechanism can be provided through identification of a linear or non-linear curve that substantially fits and accommodates the behavior of the installation itself and/or through detection and corresponding accommodation of a ringing behavior that characterizes a given installation.

In other embodiments, various other limits and/or thresholds can be utilized to control and/or detect conditions of possible concern. For example, an upper limit can be placed on the extent to which an excess force threshold can be adjusted pursuant to these various embodiments. Thresholds can also be used to detect stall conditions and/or likely component and/or system faults.

In addition to (or supplemental thereto) automatically altering a force threshold or value as a function of actual perceived force readings, pursuant to other embodiments, such thresholds/values can be modified as a function of temperature and/or runtime history of the motor(s) that effect movement of the moveable barrier. Pursuant to a preferred embodiment, such alterations are substantially limited to use during lower temperature conditions, as higher temperatures tend to impact conditions of interest with less severity. Pursuant to another preferred approach, when a significant temperature drop of interest has occurred between a present setting and a previous occurrence of interest, a larger alteration to a force value or threshold may be permitted than under other circumstances to thereby more quickly accommodate likely normal behavior of the overall system.

These various embodiments provide a variety of resultant combinations that readily suit a wide variety of expected operating conditions and design criteria. In general, these embodiments permit a force threshold value to be automatically calculated on a regular (or continuous) basis, in conjunction with or apart from a learning mode of operation, and in a fashion that tends to encourage relatively constant availability of a relevant and suitable threshold value. Various operating conditions can change slightly or significantly, suddenly or slowly, without unduly adversely impacting the availability of relevant and useful force setting or settings.

Figure 1:
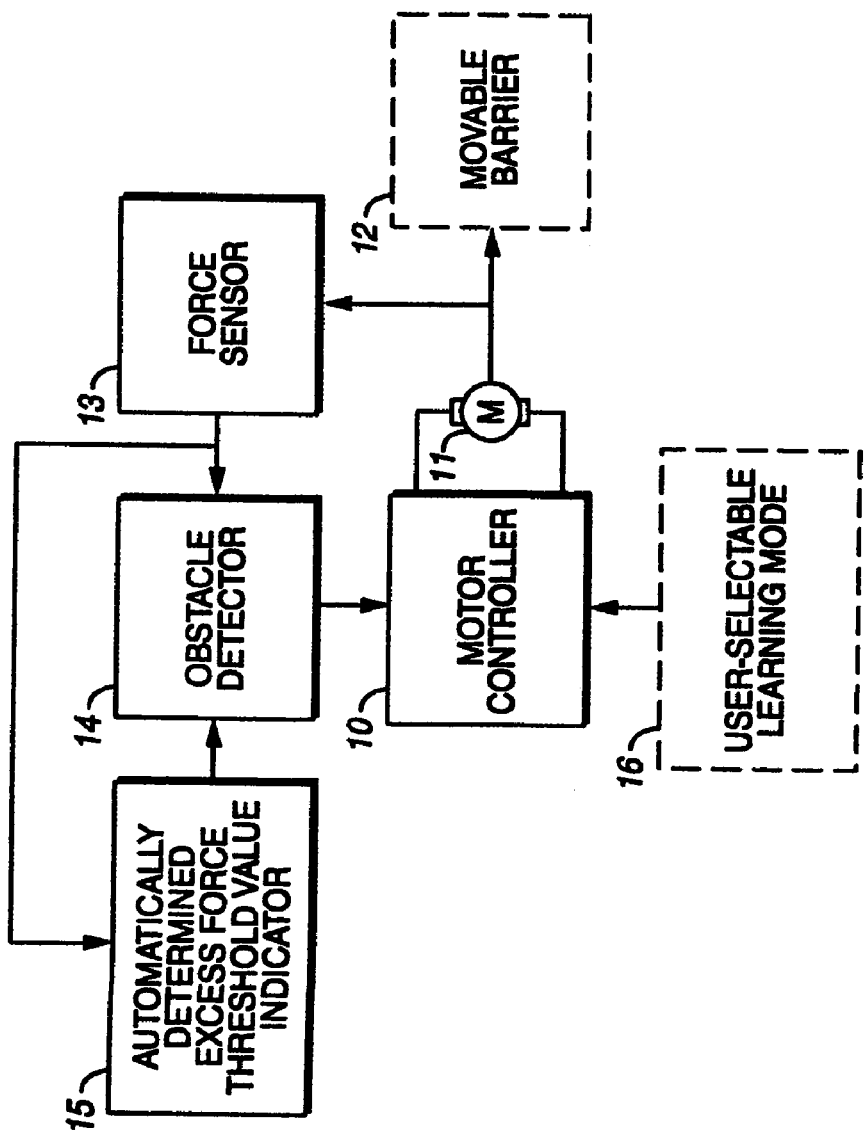
FIG. 1 comprises a block diagram as configured in accordance with an embodiment of the invention.

Referring now to FIG. 1, a motor controller 10 couples to and selectively controls a motor 11. The motor 11 in turn couples via an appropriate mechanism (not shown) to one or more movable barriers 12 (such as, but not limited to, garage doors (both single-piece and segmented), sliding and swinging gates, rolling shutters, and so forth). The motor controller 10 comprises, in this embodiment, a programmable platform (having, for example, a microprocessor or programmable gate array or the like) that can be readily programmed to serve as described herein (of course an appropriately configured static platform can be utilized as well if desired). Such elements are generally well understood in the art and hence additional description will not be presented here for the sake of brevity and the preservation of focus.

A force sensor 13 couples to monitor one or more parameters that are indicative of force as exerted by the motor 11 to effect desired movement of the movable barrier 12 (if desired, of course, a plurality of force sensors can be employed to provide either redundant monitoring capability and/or multi-point or multi-parameter monitoring). In this embodiment, the force sensor 13 comprises a mechanism (such as a current-sensing resistor) to detect current flow through the motor 11 (in general, current flow through a motor will correspond to loading and hence will tend to provide a relatively reliable indication of force being exerted by the motor). In alternate embodiments the force can be measured by velocity, a strain gauge, or any other force detection method.

The output of the force sensor 13 couples to an obstacle detector 14 and further serves to inform an automatically determined excess force threshold value indicator 15 (as described below in more detail). So configured, the obstacle detector 14 can compare force as sensed by the force sensor 13 with an excess force threshold as provided by the excess force threshold value indicator 15 to detect when the motor 11 at least appears to be outputting excess force (thereby indicating the possible presence of an obstacle in the path of the movable barrier).

In a preferred embodiment, the excess force threshold value indicator 15 automatically determines the threshold value in response to actual force as sensed by the force sensor 13. Such determinations can be made on a regular or irregular basis, but in a preferred embodiment are made at least once during each full traversal of the movable barrier. If desired, a typical user-initiable dedicated learning mode 16 can also be provided, such that an initial excess force threshold value can be initially determined via such an approach. Regardless, however, in a preferred embodiment, the excess force threshold value indicator 15 serves to determine initially (when needed) and to continually update thereafter during normal operating modes of operation the excess force threshold value. So configured, these teachings are suitable for use both with and without a platform having such a learning mode.

Similarly, it should be noted that such a system could be provided with a user-accessible excess force threshold value adjustment interface (not shown) as well understood in the art. Though such an interface can be provided, when properly configured, these teachings should, at least in a significant number of instances, mitigate against the need to make any such provision.

In a preferred embodiment, the excess force threshold value indicator 15 automatically determines a characteristic force value (in response, at least in part, to the force sensor) that corresponds to this given installation. The excess force threshold value can then be determined as a function, at least in part, of the characteristic force value. For example, the characteristic force value is summed with a predetermined offset in a preferred approach to thereby determine the excess force threshold value. So configured, the motor 11 can apply force in excess of the characteristic force value without the obstacle detector 14 interpreting such an event as an obstacle so long as the force over and above the characteristic force value does not exceed the predetermined offset.

In a preferred embodiment, it is the characteristic force value that the operator automatically adjusts to reflect changing conditions regarding the application of force during normal operation. The predetermined measure is then readily combined with the frequently updated characteristic force value to yield a correspondingly updated excess force threshold value.

So configured, and referring now to FIG. 2, during a normal mode of operation (and regardless of whether a user-initiable learning mode of operation has been earlier applied) the operator will monitor 21 a force parameter (as detected by the force sensor 13) and automatically update 22 the excess force threshold value. (As will be shown below in more detail, the operator may use a single threshold value or, in the alternative, a plurality of thresholds may be used and applied at different times during movement of the movable barrier. In a preferred embodiment, the update will occur at the end of a movement cycle, though another time or times could be utilized when and as appropriate to a given implementation.) As noted above, in a preferred embodiment, the operator will effect such updating by automatically changing a characteristic force value in response to the monitored force parameter and then using the updated characteristic force value as a basis for determining an updated excess force threshold value. The operator then uses 23 the updated excess force threshold value to determine when excess force appears to be applied by the motor 11. When the operator detects 24 the application of apparent excess force, one or more predetermined actions 25 are initiated (for example, movement of the movable barrier can be halted or reversed, alarms can be activated, an incident log can be updated, and so forth).

With reference to FIG. 3, a not untypical force response 30 for a such a system will typically exhibit a significant peak 31 during an initial period 32 of activation (or, more particularly, the motor will initially spike in a manner as suggested due to inertia and other factors, therefore causing the apparent force to appear to reach a corresponding peak). For many purposes, it may be desired to essentially ignore the force response 30 for a predetermined period of time $T_1$ (such as, for example, approximately one second) such that these peaks do not influence the resultant characteristic force value $TH_c$ and/or the excess force threshold value.

As depicted in FIG. 3, the characteristic force value $TH_c$ comprises a single value that is used as described earlier to determine a corresponding excess force threshold value during the entire period of movement of the movable barrier (from, for example, an open position to a closed position or from a closed position to an open position). As depicted, the characteristic force value $TH_c$ appears to be considerably larger than the bulk of the actual measured force response 30. Pursuant to these teachings, many of the embodiments taught herein would tend to reduce the characteristic force value $TH_c$ over time to more closely approximate the actual force response 30 (presuming, of course, that the actual force response 30 itself did not change appreciably during this period of change and re-characterization).

It is unlikely, of course, that such an actual force response 30 will be utterly flat; instead, there will usually be peaks and valleys. To the extent that such undulations, and especially the peaks, do not vary significantly from what otherwise amounts to an average value for the force response 30, there is no particular value in reflecting such minor variations in the characteristic force value $TH_c$ or the resultant excess force threshold value. A process to permit such a result appears in FIG. 4. As noted above, the force response 30 will typically begin with a brief large peak. Therefore, the process will preferably begin by waiting 41 for a minimum time (such as time $T_1$ as suggested in FIG. 3) before responding to the force response 30. Subsequent to this optional initial window of time, the process then detects the highest force response peak and measures 42 that peak force $F_p$. The process then determines 43 whether that peak force $F_p$ falls within a predetermined small range. When true, meaning that only negligible peak excursions have been observed with respect to the characteristic force value $TH_c$, the update process can simply conclude 44 without any substantive change being made to the characteristic force value $TH_c$ and/or the excess force threshold value.

Figure 5:
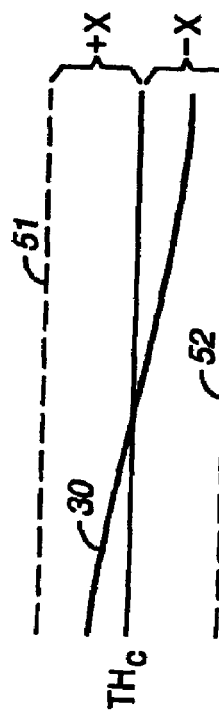
FIG. 5 comprises a graph illustrating certain particulars as accord with an embodiment of the invention.

In this embodiment, the range is established as a small amount X that is added or subtracted from the characteristic force value $TH_c$. As shown in FIG. 5, this results in an upper limit 51 equal to the characteristic force value $TH_c$ plus the amount X and a lower limit 52 equal to the characteristic force value $TH_c$ less the amount X. So configured, when the highest peak of the actual force response 30 remains within this range, the update process can conclude without resultant change to the values of interest.

With reference again to FIG. 4, when the actual force response 30 has a peak that falls outside the indicated range (being either higher than the upper limit 51 or less than the lower limit 52), the process can again automatically change 45 the characteristic force value $TH_c$ as a function, at least in part, of the peak force $F_p$. This updated value can then be used 46 to determine when excess force is seemingly being exerted as related above either for this operation or for future operations.

So configured, a movable barrier operator will effectively yield an updated characteristic force value $TH_c$ that is substantially identical to the original characteristic force value $TH_c$ when a difference as between the original characteristic force value $TH_c$ and the force measurement parameter is within a predetermined minimum range. In a preferred embodiment, the value X can be, for example five percent (5%) of the total typical initial peak force response value as occurs during the initial period 32 of energization. As described, the value X serves to bound both the upper and lower limits 51 and 52 of this range. If desired, differing values can be used to specify the upper and lower limits (this may be appropriate, for example, when seeking to render the operator more or less sensitive to a peak excursion in a given direction away from the characteristic force value $TH_c$).

When the actual force response includes a peak that exceeds the minimum range noted above, in a preferred embodiment the operator will use that information to automatically adjust the characteristic force value $TH_c$ (to thereby effect a change of the excess force threshold value). One approach to guiding the adjustment process appears in FIG. 6. Initially, the operator determines 60 whether the peak force $F_p$ exceeds the characteristic force value $TH_c$ (in a preferred approach, the operator uses a first determination process 61 when the force peak $F_p$ exceeds the characteristic force value $TH_c$ and a second determination process 62 when the force peak $F_p$ is less than the characteristic force value $TH_c$).

Pursuant to the first determination process 61, the operator determines 63 whether the force peak $F_p$ exceeds a first predetermined threshold. In this embodiment, and referring momentarily to FIG. 7, the first predetermined threshold 70 equals the characteristic force value $TH_c$ summed with a first predetermined amount Y (wherein Y is larger than the value X that establishes the minimum range described earlier).

Referring again to FIG. 6, when the force response 72 has a force peak 71 that is less than the first predetermined threshold, the operator adjusts 64 the characteristic force value $TH_c$ by setting the adjusted characteristic force value $TH_c$ to equal the current peak force $F_p$ 71. So configured, the characteristic force value $TH_c$ automatically directly tracks and corresponds to smaller force peak excursions. Therefore, as force requirements may change via small increments with circumstance or time, the characteristic force value $TH_c$ will similarly change. This, of course, leads to a corresponding change of the excess force threshold value and hence aids in ensuring that obstacle detection remains likely accurate and calibrated to current operating conditions and circumstances.

Figure 8:
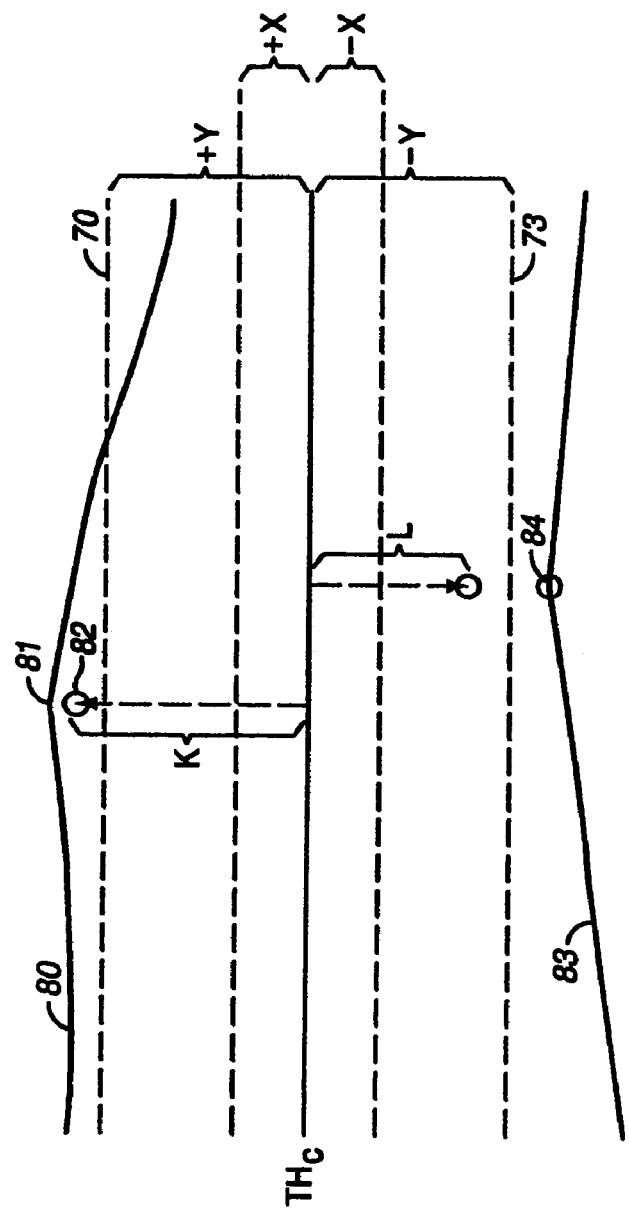
FIG. 8 comprises a graph illustrating certain particulars as accord with an embodiment of the invention.

Referring again to FIG. 6, when the operator determines 63 that the force peak $F_p$ exceeds the first predetermined threshold, the operator adjusts 65 the characteristic force value $TH_c$ by incrementing the existing characteristic force value $TH_c$ towards the current force measurement without actually reaching the current force measurement. In a preferred embodiment, this increment corresponds to a step of predetermined size or percentage (of either the difference or the absolute value and as either preset or dynamically calculated as desired). Therefore, and as illustrated in FIG. 8, when a given force response 80 has a force peak 81 that exceeds the first predetermined threshold 70, the characteristic force value $TH_c$ is incremented by a predetermined amount K, such that the resultant value 82 will approach, but not necessarily reach the current force peak 81.

So configured, the operator will tend to substantially closely track smaller force peaks and more loosely track larger force peaks when the force peaks exceed the characteristic force value $TH_c$ (when coupled with the minimum range process described earlier, of course, the operator will essentially ignore minimal force peak variations). This approach permits the operator to automatically maintain an excess force threshold value that is substantially current and relevant while also avoiding possibly over-significant adjustments that are possibly only associated with anecdotal incidents that may not again occur in the near term. (Significant temperature variations can represent one potential exception to this approach, and additional embodiments described below are directed to accommodating that circumstance.)

Referring again to FIG. 6, when the operator determines 60 that the force peak $F_p$ does not exceed the characteristic force value $TH_c$, the operator utilizes a second determination process 62 to facilitate adjustment of the excess force threshold value. Pursuant to the second determination process 62, the operator determines 66 whether the force peak $F_p$ is less than a second predetermined threshold.

Figure 7:
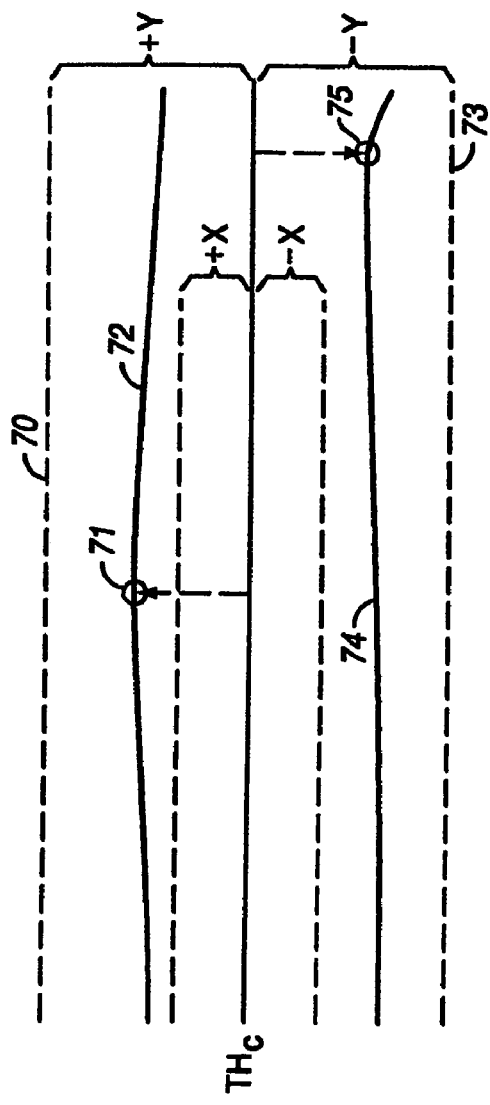
FIG. 7 comprises a graph illustrating certain particulars as accord with an embodiment of the invention.

With momentary reference to FIG. 7, in a preferred embodiment, the second predetermined threshold 73 comprises the characteristic force value $TH_c$ less a predetermined amount Y (in this embodiment, the same value Y is used to determine both the first and second predetermined thresholds 70 and 73; it would of course be possible to use different values to permit, for example, sensitizing or de-sensitizing the response of the process as desired to force response excursions).

Referring again to FIG. 6, when the operator determines 66 that the present force peak Fp is not less than the second predetermined threshold, the operator sets the present force peak $F_p$ value as the new characteristic force value $TH_c$. For example, as illustrated in FIG. 7, a force response 74 having a force peak 75 that falls between the present characteristic force value $TH_c$ and the second predetermined threshold 73 will cause the adjusted characteristic force value $TH_c$ to substantially equal the force peak 75.

Figure 6:
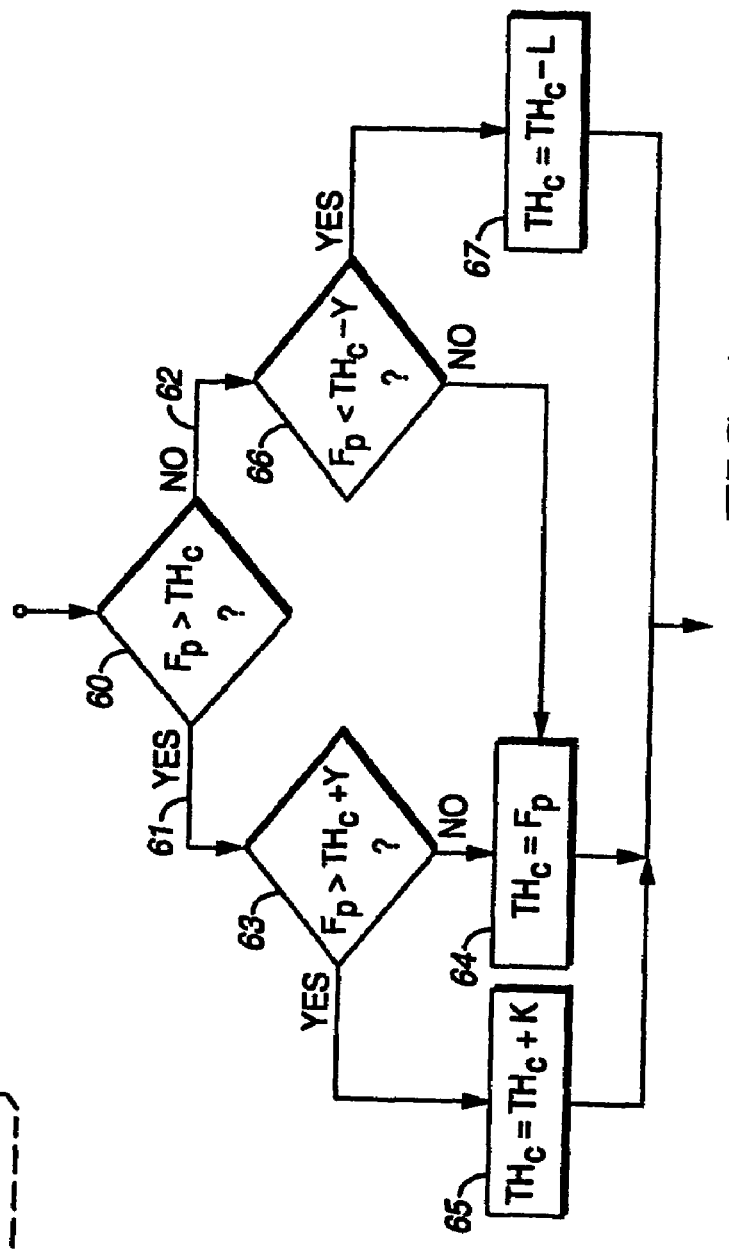
FIG. 6 comprises a flow diagram illustrating detail in accordance with an embodiment of the invention.

When the operator determines 66, however, that the force peak $F_p$ is less than the second predetermined threshold, then as shown in FIG. 6, the operator adjusts 67 the characteristic force value $TH_c$ by decrementing or changing the latter towards the current force peak $F_p$ by a predetermined step size L. As illustrated in FIG. 8, a force response 83 having a peak 84 that is less than the second predetermined threshold 73 will cause the characteristic force value $TH_c$ to be decremented or changed towards the force peak 84 by a step size L. In this embodiment, this step size L is smaller than the step size K used when incrementing the characteristic force value $TH_c$ towards a larger value as described above, and it is at least this difference that distinguishes the second determination process 62 from the first determination process 61. So configured, the operator can track (closely or loosely, depending upon the nature of the force peak excursions) changing force needs and reflect those changes in the excess force threshold value (by, in these embodiments, adjusting a characteristic force value $TH_c$). These processes, however, permit more significant immediate increases in the characteristic force value $TH_c$ than decreases. This preferred approach aids in ensuring that the operator does not quickly (and possibly inappropriately) reduce the excess force threshold value to a point where the movable barrier cannot be moved without triggering a false obstacle detection event.

As described above, the operator can be configured to essentially automatically respond to only a single peak in the force response during movement of a movable barrier from a first position to a second position, such that adjustment of the characteristic force value $TH_c$ (and/or the excess force threshold value) will be essentially based only on that one peak and value. For many situations, this approach will provide satisfactory results. In other instances, however, it may be desirable to detect and/or respond to more than just this one peak.

For example, and referring now to FIG. 9, a given operator may detect a force response 90 that is more complex than the simpler responses illustrated above. As one illustration, in FIG. 9, the force response 90 has a first peak plateau 91 that is followed by a second plateau 92 and then by a third relative plateau 93. With such a force response 90, an excess force threshold value that tracks the force peak represented by the first peak plateau 91 may possibly be too high for one or more of the later plateau areas 92 or 93. Pursuant to one embodiment, the operator automatically segments or partitions the force response 90 as a function of time and determines characteristic force value $TH_c$'s that correspond to each resultant time window. So configured, the resultant characteristic force values would then correspond to particular times during the time the operator moves the movable barrier and would, in a preferred embodiment, be recalled and utilized at such times. If desired, the number of threshold values (and hence the number of corresponding steps) can be fixed at a predetermined level.

For example, and with continued reference to FIG. 9, during the time window 94 bounded by time $T_1$ and $T_2$, a force response peak that corresponds to the first force plateau 91 can be used as described above to adjust a characteristic force value $TH_c$ for this first time window 94. In a similar fashion, during the next succeeding time window 95 (as bounded by time $T_2$ and $T_3$), a force response peak that corresponds to the second force plateau 92 can be used as described above to adjust a characteristic force value $TH_c$ for this second time window 95. In a similar fashion, other characteristic force values $TH_c$ can be determined for other corresponding windows of time.

In a preferred embodiment, the number of resultant characteristic force values $TH_c$ and the time windows to which such values correlate are dependent upon the force response itself as detected by the operator. For a simple response as illustrated earlier, a single characteristic force value $TH_c$ can be automatically utilized as a satisfactory guide. For more complicated responses such as the one illustrated in FIG. 9, a plurality of such values can be automatically determined to more likely ensure ultimate provision of a relevant excess force threshold value. In another approach, the number of characteristic force values $TH_c$ and/or the specific correlation of such values to specific times or barrier positions/locations can be previously determined and set by the manufacturer or installer and/or during a user-initiated learning mode of operation.

In the embodiment above, multiple characteristic force values $TH_c$ are determined with each such value being calculated as a specific function of a corresponding portion of the force response itself. Pursuant to another embodiment, a curve can be fit to match, to a greater or lesser extent, the force response. This curve can then be used to permit dynamic determination of a plurality of characteristic force values $TH_c$.

To illustrate this approach, consider first a force response 100 as depicted in FIG. 10 that comprises a representative function of the force exerted by an operator to effect movement of a movable barrier from a first position to a second position. It can be seen that a first force peak $P_1$ occurs at approximately time $T_1$ and that a second relative peak $P_2$ occurs at approximately time $T_2$. These peaks $P_1$ and $P_2$ are then used to establish corresponding characteristic force values $TH_c$ as described above. Between the two resultant values, however, a curve is fit to substantially connect such values.

Figure 11:
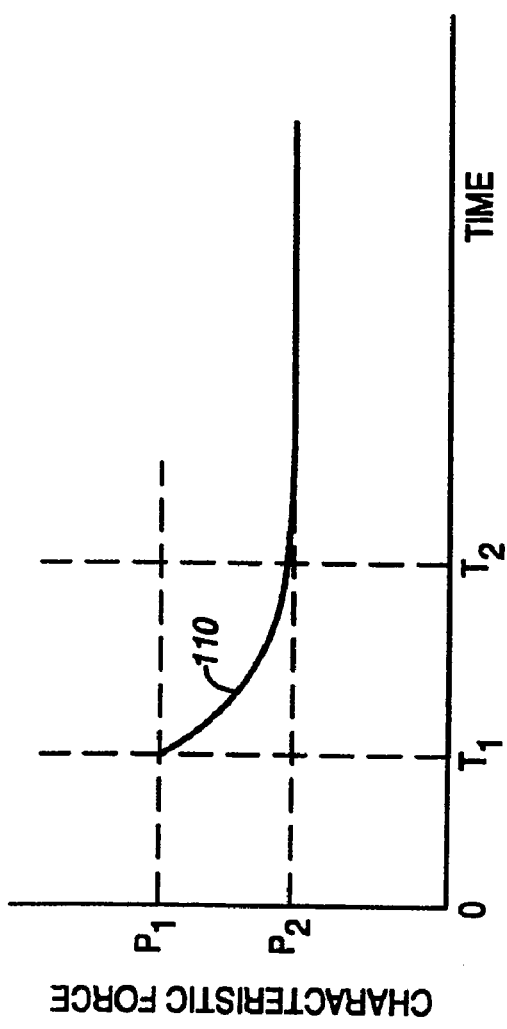
FIG. 11 comprises a graph illustrating certain particulars as accord with an embodiment of the invention.
Figure 12:
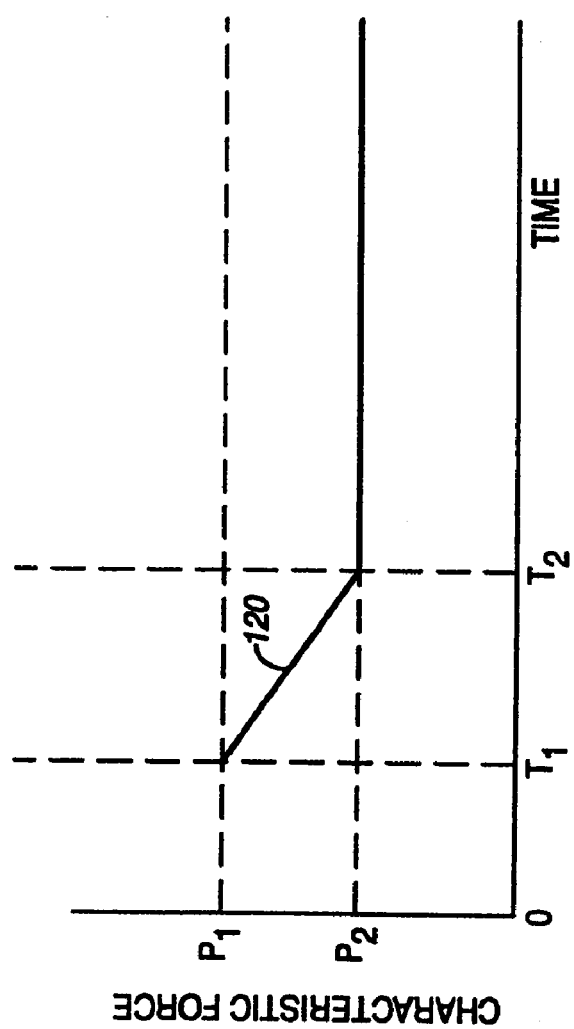
FIG. 12 comprises a graph illustrating certain particulars as accord with an embodiment of the invention.

For example, with reference to FIG. 11, a curve 110 can be used to connect the two peak values $P_1$ and $P_2$. This curve 110 can then be used to permit determination of corresponding characteristic force values and/or excess force threshold values. In particular, at any given time between $T_1$ and $T_2$, the operator can utilize the curve 110 to ascertain a corresponding characteristic force value $TH_c$ and then use that value as taught above to determine an excess force threshold value that corresponds to that particular time. Various curves can be used as desired, including exponential curves. In one embodiment, the operator may have only a single curve definition to use in this manner. Pursuant to another embodiment, the operator may have a plurality of curve definitions to choose from. By one preferred approach, the operator can compare these various resultant curves against the actual force response to identify a curve that best approximates the actual force response. The curve that best fits the present operating conditions would then be used as otherwise described above. With reference to FIG. 12, it would also be possible to utilize a line 120 to connect the peak values as otherwise described above. Again, such a line might represent a best fit under some operating conditions.

Figure 13:
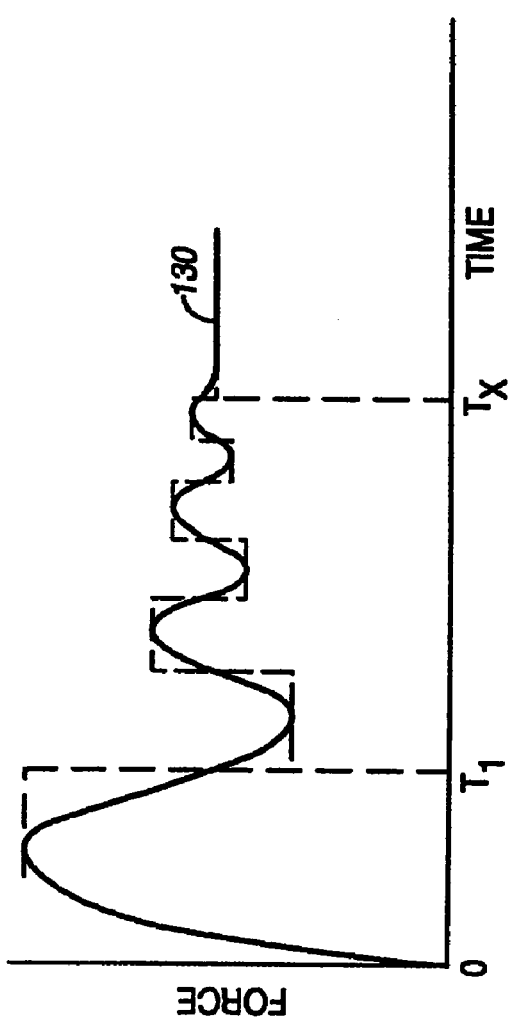
FIG. 13 comprises a graph illustrating certain particulars as accord with an embodiment of the invention.
Figure 14:
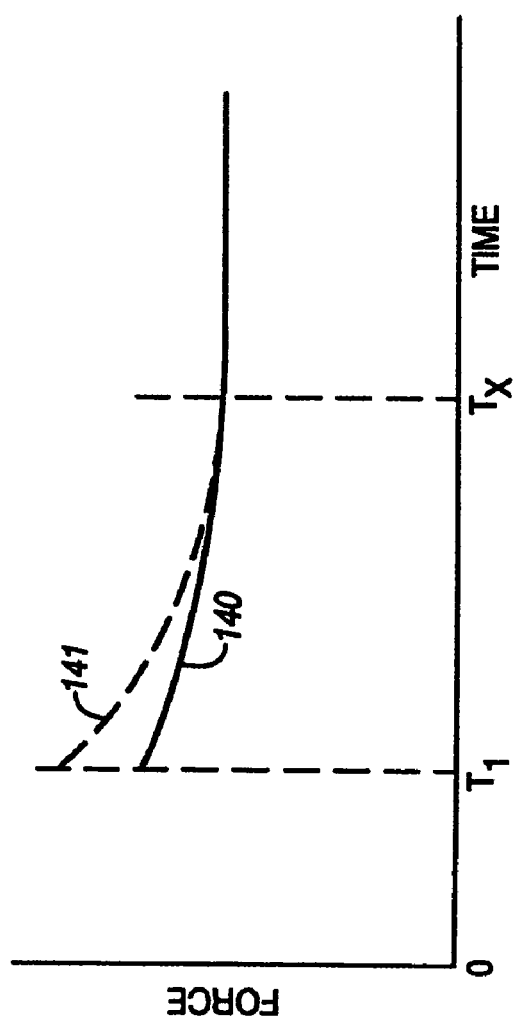
FIG. 14 comprises a graph illustrating certain particulars as accord with an embodiment of the invention.

Undue mechanical resonance (or ringing) can contribute to a resultant corresponding ringing force response that may not be satisfactorily accommodated by the various embodiments set forth above. Such ringing can occur, for example, when especially heavy barriers are moved. FIG. 13 depicts an illustrative ringing force response 130 characterized by a series of dampening resonant oscillations featuring consecutive peaks and valleys. Upon detecting such a condition (or upon otherwise being instructed to operate as now described), the operator then detects the peaks and valleys of the force response 130 and thereby ascertains a time $T_x$ when the ringing phenomena has dampened sufficiently to no longer represent a significant concern. For example, when the distance between a consecutive peak and valley (or valley and peak) is less than a predetermined distance, the operator can conclude that the oscillation has dampened to a sufficient level. The operator can then select an appropriate curve 140 to represent the force response 130 between an initial time $T_1$ and the time $T_x$ as illustrated in FIG. 14. Again, various curves can be provided, such that alternative curves 141 can be sampled and compared to permit selection of a most appropriate curve. Once selected, the curve can then again be used as described above to permit adjustment of the characteristic force value $TH_c$ and/or the excess force threshold value.

As noted earlier, the initial portion of a force response tends to exhibit a significant transient peak. As already suggested, this initial peak can be essentially ignored when seeking to automatically set an appropriate threshold to detect an apparent application of excess force. The ordinary occurrence of this phenomena, however, can be used, if desired, to ascertain a likely status of the force monitoring sensor and/or the signal pathways that pertain thereto. During time periods subsequent to the initial peak, it is also possible that force response peaks can provide an indication of operational status other than the likely presence of an obstacle.

Figure 16:
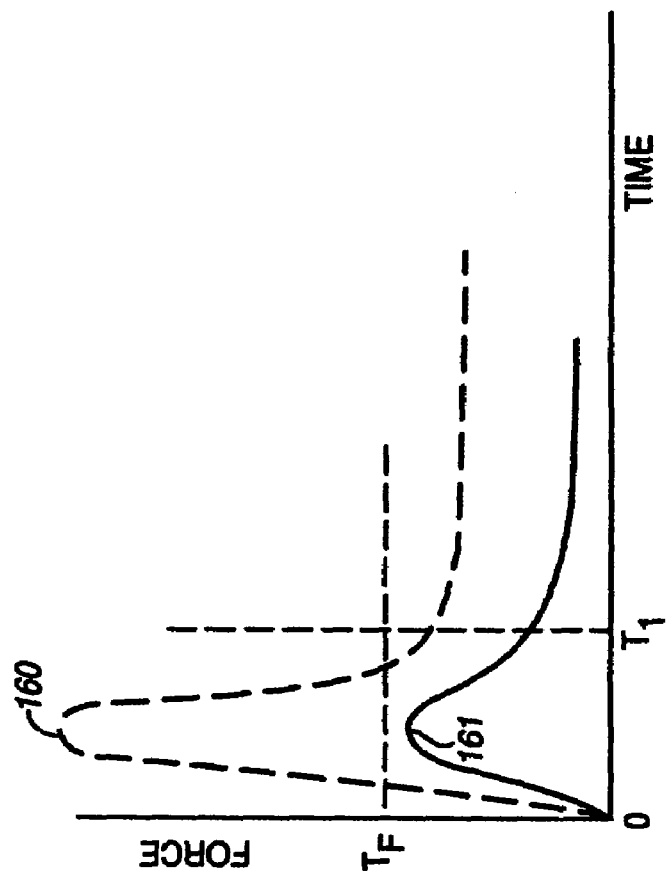
FIG. 16 comprises a graph illustrating certain particulars as accord with an embodiment of the invention.
Figure 15:
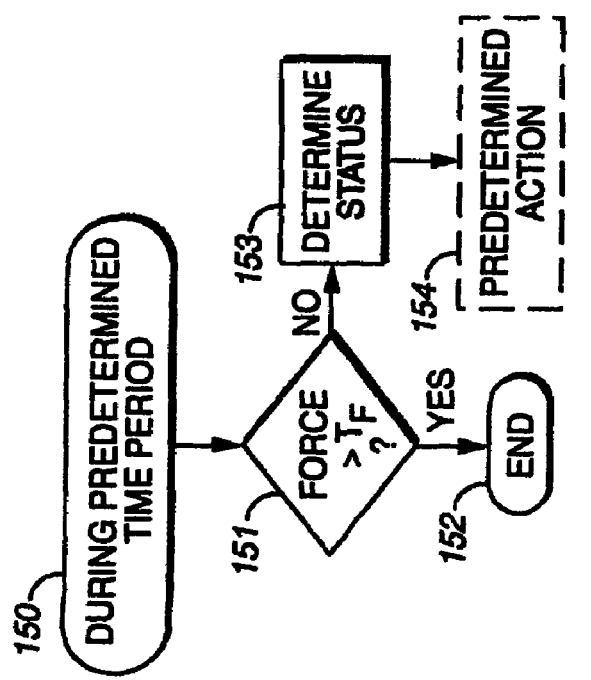
FIG. 15 comprises a flow diagram illustrating detail in accordance with an embodiment of the invention.

With reference to FIG. 15, during a predetermined time period of interest 150 (comprising, in this example, the initial time period during which the transient force peak ordinarily occurs), the operator determines 151 whether the present force measurement exceeds some threshold $T_F$. As suggested by FIG. 16, this threshold $T_F$ is set, in a preferred embodiment, considerably lower than the expected transient peak 160 (and preferably at a level that is less than the minimum force ordinarily needed to cause selective movement of the movable barrier). When the measured peak exceeds this threshold, the process can conclude 152 as set forth in FIG. 15. When, however, the initial peak 161 is less than the threshold $T_F$, and referring again to FIG. 15, the operator can determine 153 a corresponding status and then optionally take a predetermined action 154. For example, the operator can conclude that the force sensor is faulty (such a greatly limited or reduced initial transient response would likely suggest, for example, a problem or fault with the current sensing resistor or other related electrical failure). The predetermined action 154 could include, for example, not automatically updating the characteristic force value $TH_c$ at this time or as might otherwise be based upon present or immediately subsequent data.

Figure 17:
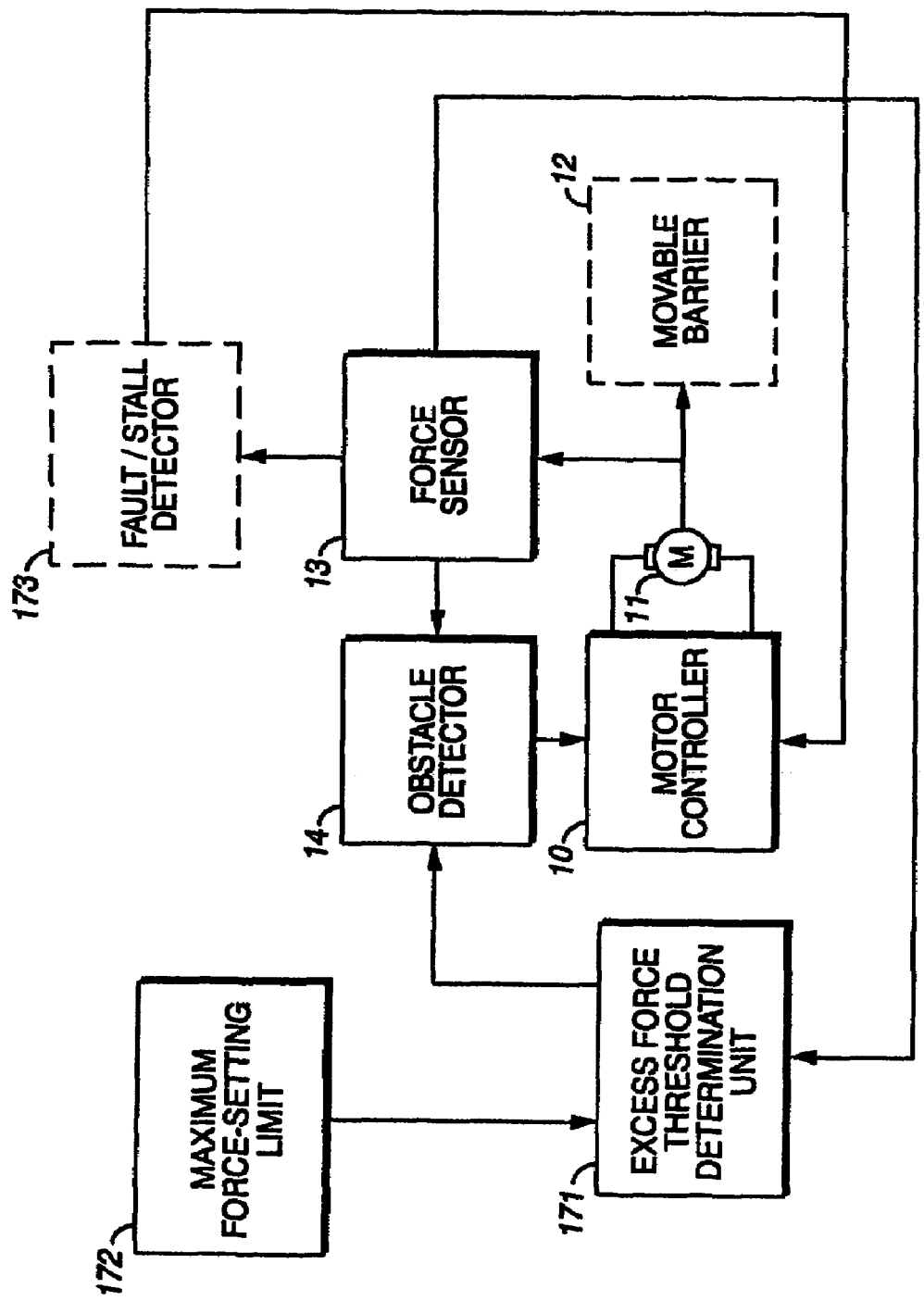
FIG. 17 comprises a block diagram as configured in accordance with an embodiment of the invention.
Figure 18:
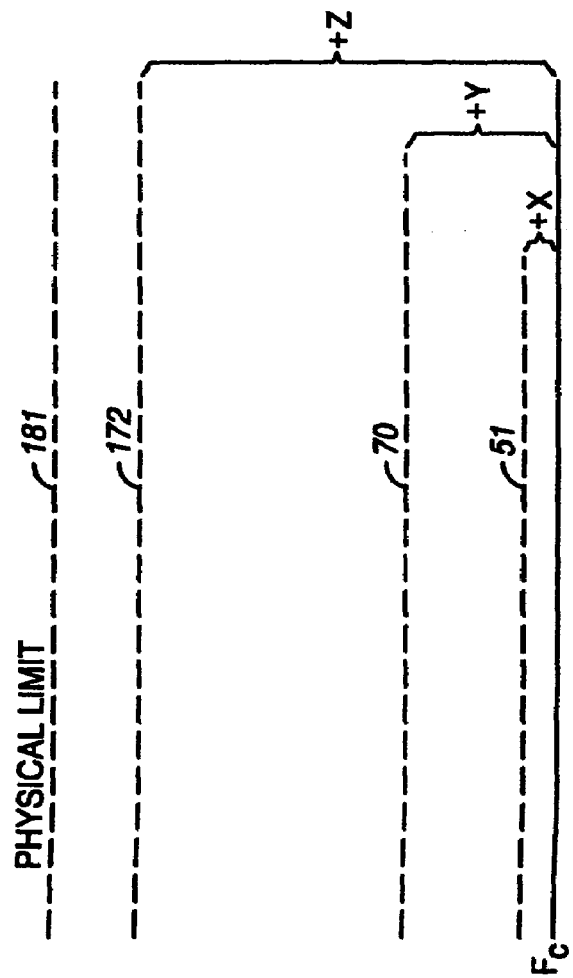
FIG. 18 comprises a graph illustrating certain particulars in accord with an embodiment of the invention.

There also are other conditions that such monitoring of force can potentially reveal. To illustrate, FIG. 17 depicts a supportive embodiment. In this embodiment, the excess force threshold value is provided by an excess force threshold determination unit 171 as otherwise generally related above. In this embodiment, however, the excess force threshold determination unit 171 further utilizes a maximum force-setting limit 172. With momentary reference to FIG. 18, this maximum force-setting limit 172 comprises a limit beyond which the operator can not automatically drive the characteristic force value $TH_c$. This maximum adaptation limit is larger than either of the earlier adaptation thresholds 51 or 70 described earlier, but is also smaller than a physical limit 181 that would otherwise limit the characteristic force value $TH_c$ (the physical limit 181 being such as the maximum force that the motor 11 can conceivably deliver under the most favorable of conditions). As a result, the excess force threshold value provided by the excess force threshold determination unit 171 essentially comprises a maximum force-setting limited excess force threshold value, in that the excess force threshold value itself becomes limited with respect to the maximum force-setting limit 172. The maximum force-setting limit can comprise a non-alterable limit or can be otherwise established, such as during a learning mode of operation as desired and appropriate to a given application.

Figure 19:
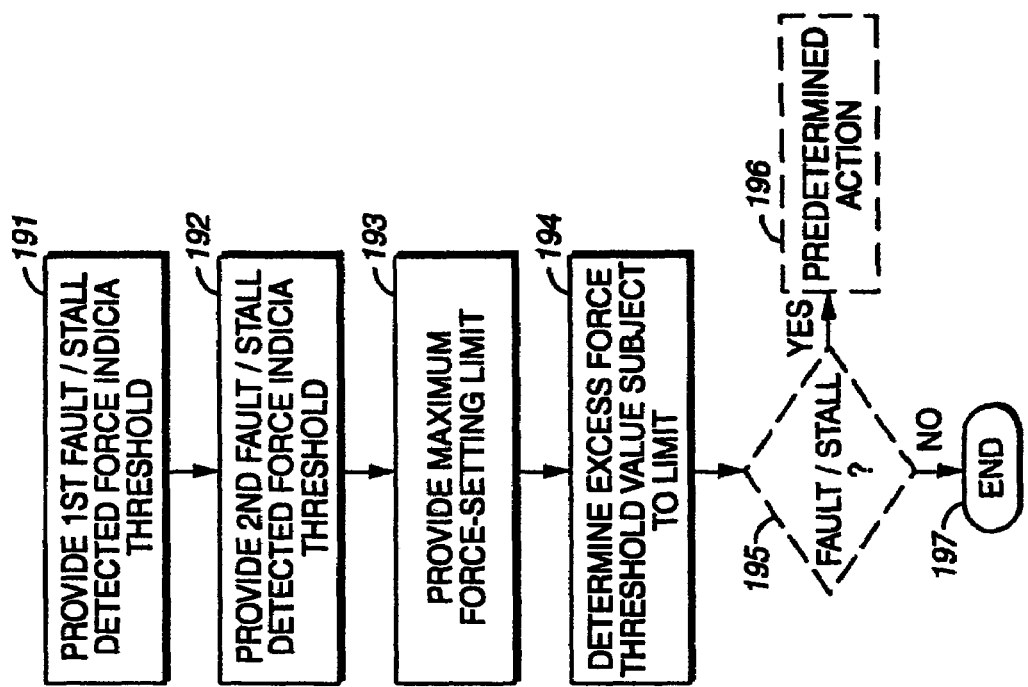
FIG. 19 comprises a flow diagram illustrating detail in accordance with an embodiment of the invention.
Figure 20:
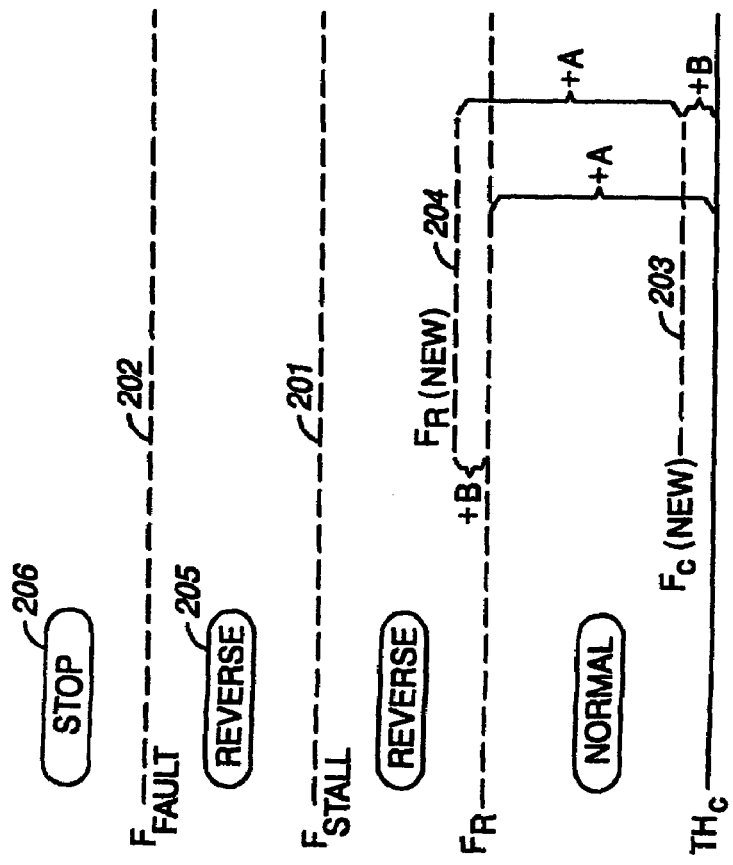
FIG. 20 comprises a graph illustrating certain particulars as accord with an embodiment of the invention.

If desired, and referring again to FIG. 17, the motor controller 10 can also be made responsive to a fault/stall detector 173. The fault/stall detector 173 utilizes, in a preferred embodiment, one or more other thresholds to identify circumstances that likely indicate at least one of a fault condition and a stall condition. For example, with reference to FIG. 19, the detector 173 can optionally provide 191 a first fault/stall detected force indicia threshold and a second 192 fault/stall detected force indicia threshold. With reference to FIG. 20, the first such threshold 201 can more specifically comprise an $F_{stall}$ threshold that corresponds to a level of force that likely indicates that the motor 11 is stalled. The second such threshold 202 can more specifically comprise an $F_{fault}$ threshold that corresponds to a level of apparent force that likely indicates that one or more faults exist in the force-sensing signal path. Such thresholds can of course be set to correspond empirically to a given movable barrier opener.

Referring again to FIG. 19, a maximum force-setting limit 172 can also be provided 193 as already earlier described. During normal operation, the operator then determines 194 an excess force threshold value (or values as described above) subject to the maximum force-setting limit 172 and provided also that the operator will now further determine 195 whether a fault/stall condition likely exists based, at least in part, on current force measurements. As illustrated in FIG. 20, the excess force threshold value $F_R$ can be determined 194 by combining the characteristic force value $TH_c$ with a predetermined offset A (the value of A can be selected as appropriate to a given application but in general will serve to provide room for ordinary force peak excursions that are not likely indicative of an obstacle while also being small enough to likely ensure that an obstacle will be detected relatively soon following impact). As also illustrated (and as otherwise described above), the operator will automatically change the characteristic force value $TH_c$ as a function, at least in part, of the actual force response. For example, the characteristic force value $TH_c$ may be moved upwardly by an amount B to provide an updated characteristic force value $TH_c$ 203 due to such circumstances. When this occurs, the predetermined offset A is again applied to establish an updated excess force threshold 204.

So configured, the operator will automatically set an excess force threshold value as a function of the measured force response. When the force response exhibits a peak that exceeds either of the $F_{stall}$ or $F_{fault}$ thresholds, however, the operator will determine 195 that a corresponding stall or fault has occurred and then take an optional predetermined action 196. For example, and referring again to FIG. 20, when the force response exceeds the $F_{stall}$ threshold 201, the operator can cause the motor 11 to reverse 205 and thereby move the movable barrier in an opposite direction. When the force response exceeds the $F_{fault}$ threshold 202, the operator can cause the motor 11 to stop 206 and thereby stop movement (or attempted movement) of the moveable barrier.

It can therefore be seen that a movable barrier operator can monitor force (typically by monitoring a parameter that itself varies in a way that corresponds to the apparent application of force) and use that measurement to automatically and dynamically modify an excess force threshold during normal operations. In addition, such force monitoring can be further used to detect various fault conditions and or stalled circumstances.

Figure 21:
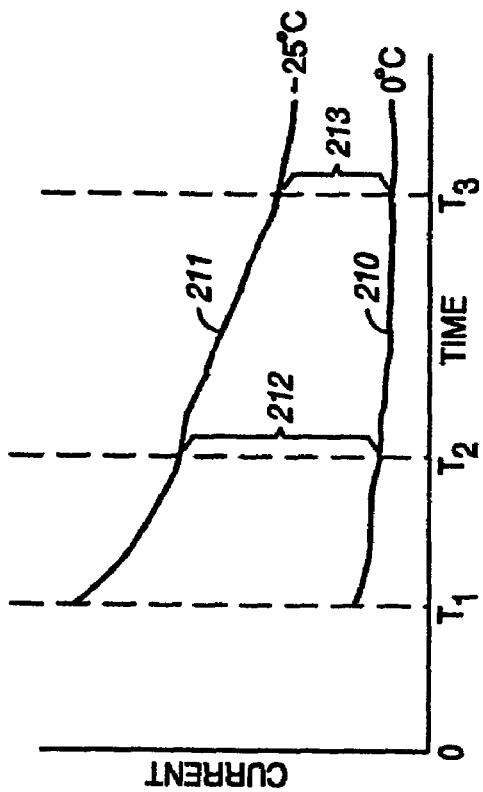
FIG. 21 comprises a graph illustrating certain representative phenomena.

As noted earlier, temperature can also significantly impact such processes, at least under some circumstances. For example, current flow requirements of a motor can increase as ambient temperature drops (at least during periods when the motor has not recently operated). Such phenomena is generally suggested in the illustration of FIG. 21. A force response 210 of a given motor at zero degrees Celsius will tend to be considerably lower than a force response 211 for that same motor at minus twenty-five degrees Celsius (note that in these illustrations the force responses 210 and 211 are only shown subsequent to the initial period of time during which the transient peak tends to be manifested). Unfortunately, the differences tend to be non-linear. That is, the difference 212 between the two force responses at one time $T_2$ will tend to be different than the difference 213 between the two force responses at a later time $T_3$. These temperature dependent behaviors present yet additional challenges to the provision of a successful automatic force-setting-platform.

Figure 23:
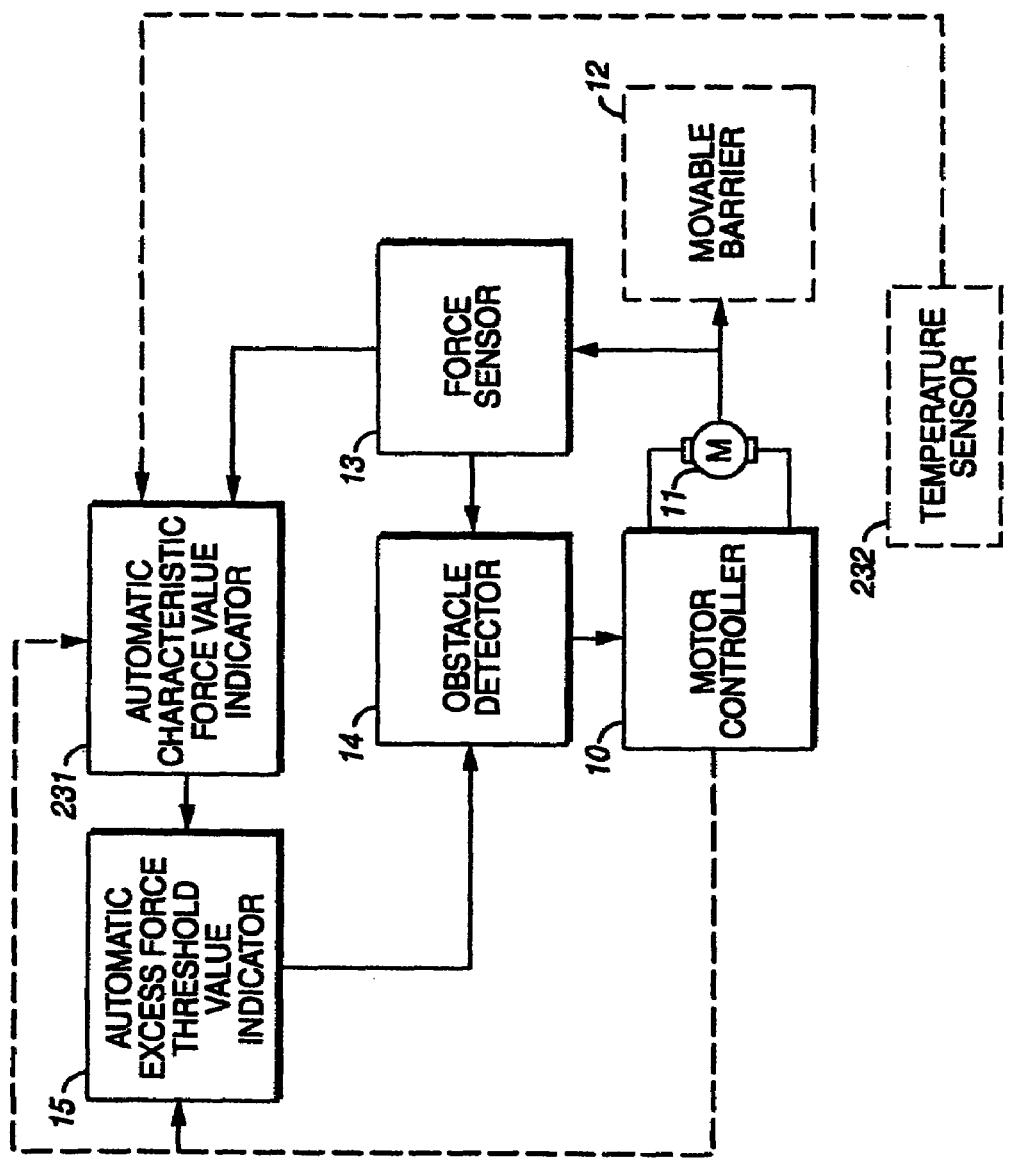
FIG. 23 comprises a block diagram as configured in accordance with an embodiment of the invention.
Figure 22:
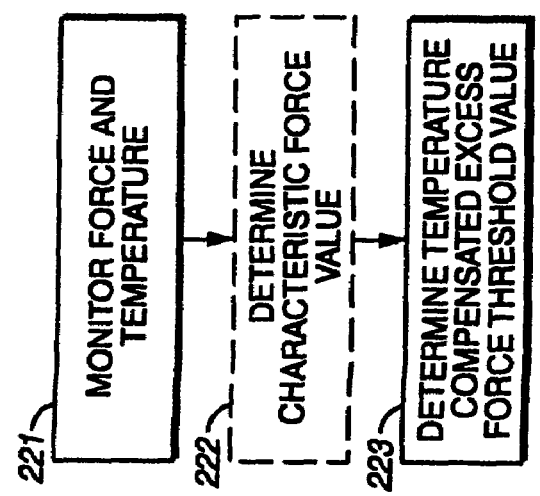
FIG. 22 comprises a flow diagram illustrating detail in accord with an embodiment of the invention.

Therefore, pursuant to another set of embodiments, and referring now to FIG. 22, any of the above embodiments can be modified to further accommodate monitoring 221 both force and temperature (such as ambient temperature proximal to the motor) and, in conjunction with determination 222 of the characteristic force value $TH_c$ (and/or the excess force threshold value) a determination 223 can also be made of a temperature compensation factor to thereby yield a temperature compensated excess force threshold value. To facilitate this, and referring now to FIG. 23, a temperature sensor 232 can serve to provide current temperature information to an automatic characteristic force value indicator 231. So configured, the automatic characteristic force value indicator 231 can utilize the temperature information to appropriately compensate the characteristic force value $TH_c$ and thereby facilitate the determination of a temperature compensated excess force threshold value. If desired, of course, it would also be possible to provide the temperature information to the automatic excess force threshold value indicator 15 and provide for temperature compensation directly to the latter.

Figures 24, 25:
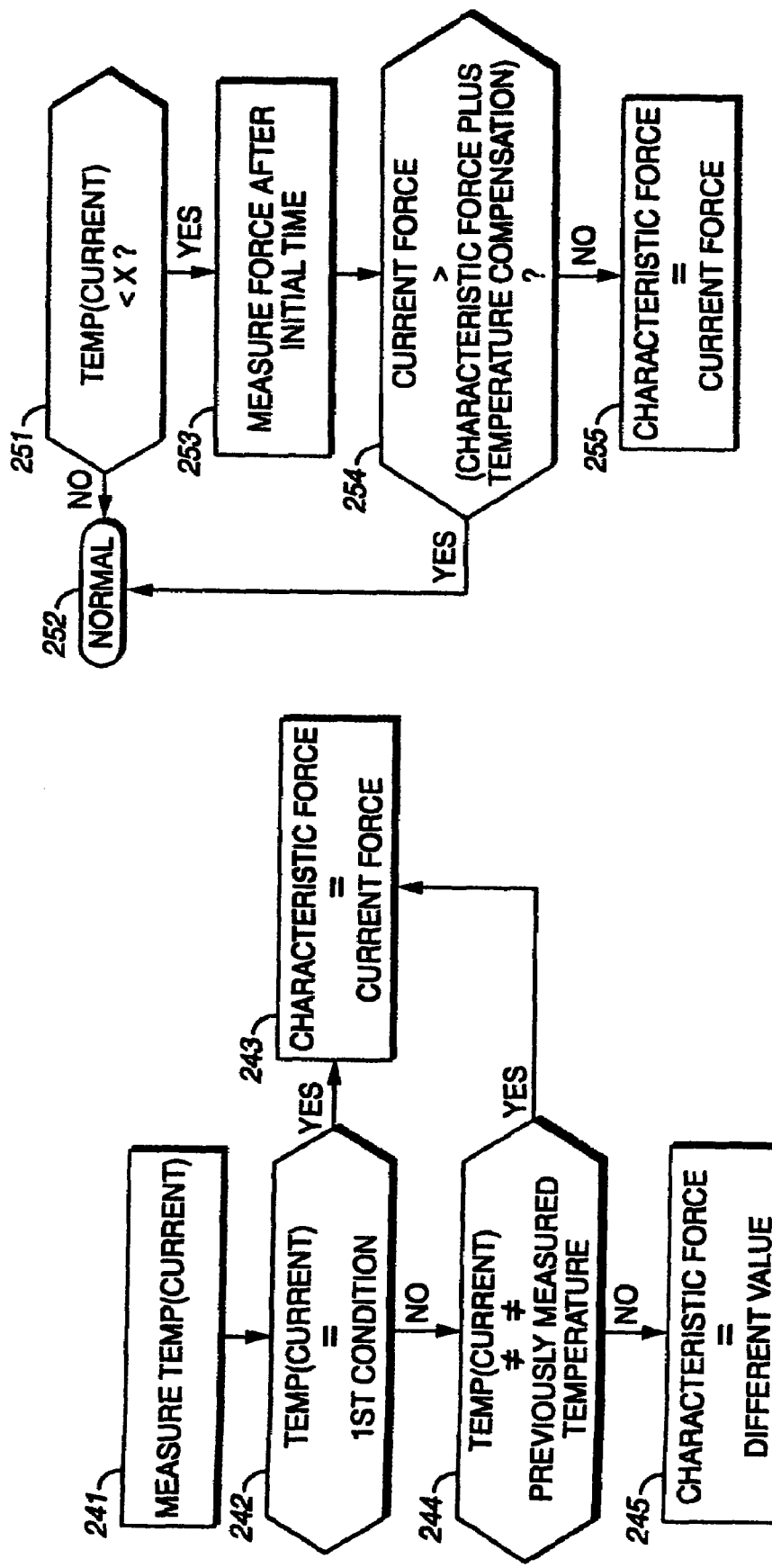
FIG. 24 comprises a flow diagram illustrating detail in accord with an embodiment of the invention.
FIG. 25 comprises a flow diagram illustrating detail in accord with an embodiment of the invention.

There are a number of ways to effect such an approach. With reference to FIG. 24, pursuant to one embodiment, current temperature is measured 241 and then compared 242 against a first condition. In this embodiment, the first condition prompts a determination as to whether the current temperature is less than a predetermined value, such as zero degrees Celsius. When true, the characteristic force value $TH_c$ is immediately set 243 to the current peak force (regardless of whether smaller movements would have otherwise been utilized pursuant to any of the above embodiments). (The characteristic force value $TH_c$ can be set in this fashion on either a temporary basis (such as only for the present operation) or until otherwise changed pursuant to the other teachings set forth herein as appropriate to a given application.) When the current temperature does not meet the first condition, the process next determines 244 whether the current temperature is substantially different than a previously measured temperature as corresponds to a previous force peak that was previously utilized to facilitate adjustment of the excess force threshold value. When true, thereby indicating that a substantial difference in temperature exists as between the present setting and a most recent prior setting, the process again sets the characteristic force value $TH_c$ to equal the current force peak (as before, this change can be temporary, such as for only a single operation, or of a potentially more lasting nature). Otherwise, when the present temperature and prior temperature are not significantly different from one another, the characteristic force value $TH_c$ is set to a different value, albeit one that may still be temperature compensated.

In general, as the temperature drops, the temperature compensation will tend to comprise an ever-increasing additive value that the process combines with the characteristic force value $TH_c$ (and/or the excess force threshold value) to thereby increase the resultant excess force threshold value. Pursuant to a preferred embodiment, the following equation can be utilized to determine the magnitude of this additive value when the characteristic force value $TH_c$ is not otherwise simply set to equal the current force peak.

$$\text{Temperature compensation value} = \frac{MTF - TH_c}{8} \cdot \frac{Temp(diff)}{K}$$

where:
MTF=a maximum upper threshold boundary;
$TH_c$=current characteristic force value;
Temp(diff)=the current temperature less the previous temperature; and
K=a constant that corresponds to the temperature sensor 232 itself (such as when the sensor comprises a thermistor).

This equation will tend to produce a higher value as the ambient temperature drops quickly by a significant amount. Referring now to FIG. 25, in an alternative approach using temperature compensation, the operator first determines 251 whether the current temperature is less than a predetermined amount X (such as, in a preferred embodiment, zero degrees Celsius). If not, temperature differences often lend considerably less impact upon force and/or force sensing and hence normal 252 processing sans temperature compensation as described earlier will proceed. When the current temperature falls below the desired threshold, however, the operator measures 253 force. For purposes of this particular activity, the force need only be measured subsequent to the initial time period during which the characteristic transient peak ordinarily occurs. The operator then determines 254 whether the current measured force exceeds the current characteristic force value $TH_c$ as combined with a current temperature compensation value (wherein the current temperature compensation value can be calculated or otherwise obtained as described above). When true, the process continues in normal fashion (wherein the characteristic force value $TH_c$ is combined with the temperature compensation value and the excess force threshold value is determined accordingly). When the current peak force is less than the characteristic force value $TH_c$ as combined with the temperature compensation value, however, this process then sets 255 the characteristic force value $TH_c$ to equal the current force peak. So configured, the process will permit ordinary temperature compensation when significant differences are not present but will prompt rapid significant alteration when significant force differences are present under these conditions.

Figure 26:
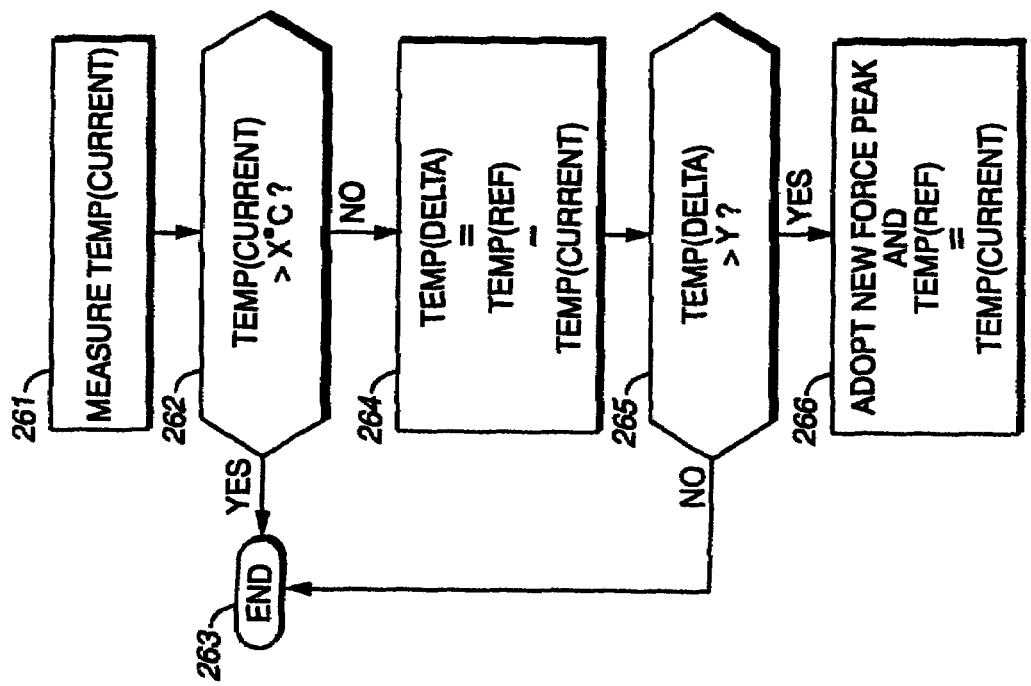
FIG. 26 comprises a flow diagram illustrating detail in accord with an embodiment of the invention.

With reference to FIG. 26, yet another temperature compensation approach has the operator again measure 261 the current temperature and determine 262 whether it is cold enough to warrant temperature compensation. If not cold enough, the temperature compensation process can simply conclude 263. When it is cold enough, however, the operator then determines 264 a temperature differential TEMP(delta) by determining a difference between a previous temperature TEMP(ref) (as ordinarily corresponds to a previously utilized force measurement) and the current temperature. The operator then determines 265 whether this difference exceeds a predetermined amount Y (such as, in a preferred approach, 2.5 degrees Celsius). If not, then ordinary temperature compensation via use of a temperature compensation adder value can continue as described above. When the difference exceeds this predetermined amount, the operator facilitates rapid force-setting compensation by adopting 266 the current force peak as the updated characteristic force value $TH_c$ (while also establishing the current temperature as the reference temperature for use in a subsequent iteration of this same process). So configured, ordinary incremental temperature compensation can be utilized at colder temperatures with an immediate significant alteration to the characteristic force value when a significant shift in temperature during a colder interval occurs. In a preferred embodiment, such an immediate significant alteration will comprise the only force-setting alteration made during this corresponding cycle.

Figure 27:
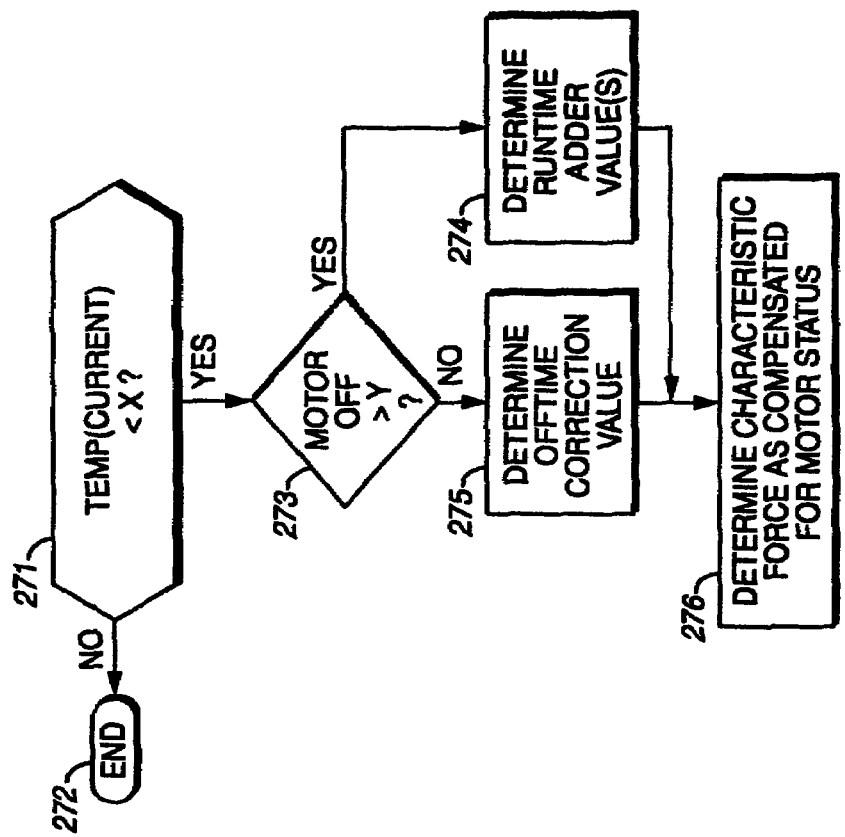
FIG. 27 comprises a flow diagram illustrating detail in accord with an embodiment of the invention.

As mentioned earlier, runtime for the motor 11 can also impact accurate assessment of force, and particularly so during colder temperatures. Pursuant to yet another embodiment the operator can compensate for such phenomena. With reference to FIG. 27, the operator can optionally determine 271 whether the current temperature is less than a predetermined threshold X (in a preferred embodiment, X equals zero degrees Celsius). With warmer temperatures, the operator can typically dispense with any need for running motor compensation and simply proceed with normal 272 automatic force-setting procedures as related herein. At colder temperatures, however, the operator then determines 273 whether the motor 11 has had a predetermined operational state for more than a predetermined period of time Y. In a preferred approach, the operator determines 274 whether the motor 11 has been off for more than the time Y (Y can be selected as appropriate to a given application and generally should be no less than a period of time, such as thirty to sixty minutes, during which a motor will reach a quiescent state with respect to these phenomena).

When the motor 11 has been off for more than the time Y, the operator determines 274 an appropriate runtime adder value (or values as appropriate to the application). With momentary reference to FIG. 28, these adder values can be dynamically determined if desired or by access to an appropriate look-up table or similar mechanism. In general, these adder values comprise force values that are suitable to add to the characteristic force value to yield a suitably motor runtime compensated characteristic force value. Such adder values will vary with the current temperature and further vary over time (the length of time that the motor has been running). Two exemplary adder value curves are shown in this figure, comprising a first curve 281 for minus 40 degrees Celsius conditions and a second curve 282 for minus 20 degrees Celsius conditions. It can be seen that, in general, the adder value is larger at lower temperatures and at lower durations of runtime for the motor. When a motor has been off for the predetermined period of time, the adder value will begin at time zero and with a curve that most closely corresponds to the current temperature (a large number of such curves can be determined and stored or, in the alternative, a few such curves can be stored and interpolation utilized to determine specific adder values for a given current temperature). So configured, an appropriate adder value is determined for a specific point in time (for example, at minus forty degrees Celsius and at time $T_n$, a specific corresponding point 283 on the corresponding curve 281 will comprise the motor runtime adder value).

Referring again to FIG. 27, when the motor has not been off for the predetermined period of time (meaning usually that the motor was just recently used), the operator determines 275 an appropriate offtime correction value. In particular, and referring now to FIG. 29, a similar set of curves are provided for various ambient temperature conditions (with one such curve 291 for minus forty degrees Celsius being shown in this illustration). So configured, an appropriate time location is determined (as corresponds to how long the motor has been off since having just recently been on), such as time $T_n$, and the corresponding point 292 on the appropriate curve 291 again utilized to determine an appropriate motor offtime correction value.

Referring again to FIG. 27, the operator then uses the runtime adder value or the offtime correction value to determine 276 a characteristic force value that comprises a motor compensated characteristic force value. The latter can then be utilized as otherwise described above to permit eventual provision of a motor runtime compensated excess force threshold value.

Pursuant to these various embodiments, a movable barrier operator can effect automatic force-setting with or without a user-initiated learning mode and/or a user manipulable force-setting interface. Such automatic force-setting can loosely or closely follow force peak excursions that do not otherwise appear to evince a problem. The force-setting process can be compensated to account for variations that are ordinarily associated with environmental conditions such as temperature as well as with operational status such as motor runtime. In addition, the operator can utilize such force measurements to ascertain other potential conditions of concern, including faulty components and stalling. Such benefits accrue with only a modest addition of corresponding sensor(s) and/or other components or programming and tend to assure that an auto-force setting movable barrier operator can reliably detect and respond to an obstacle under a variety of changing operational circumstances.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A movable barrier operator for use with a movable barrier, which movable barrier is selectively moved through selective application of force via the movable barrier operator, the movable barrier operator comprising:
    at least one force sensor;
    a movable barrier obstacle detector that is at least partially responsive to the at least one force sensor and to at least one automatically determined excess force threshold value;
    a motor controller operably coupled and responsive to the movable barrier obstacle detector;
        an automatic characteristic force value indicator responsive to the at least one force sensor and having a characteristic force value output that is substantially dependent on a difference between at least one previous characteristic force value output and a substantially present force value that is based, at least in part, on the at least one force sensor, and wherein the at least one automatically determined excess force threshold value is based, at least in part, on the characteristic force value output;
        wherein the movable barrier operator has no user-initiable dedicated learning mode of operation.

2. A movable barrier operator for use with a movable barrier, which movable barrier is selectively moved through selective application of force via the movable barrier operator, the movable barrier operator comprising:
    at least one force sensor;
    a movable barrier obstacle detector that is at least partially responsive to the at least one force sensor and to at least one automatically determined excess force threshold value;
    a motor controller operably coupled and responsive to the movable barrier obstacle detector;
        a motor on-time sensor and wherein the at least one automatically determined excess force threshold value comprises an automatically determined motor on-time-compensated excess force threshold value;
        wherein the movable barrier operator has no user-initiable dedicated learning mode of operation.

3. A movable barrier operator having a user-selectable learning mode of operation and a normal mode of operation for use with a movable barrier, which movable barrier is selectively moved through selective application of force via the movable barrier operator, the movable barrier operator comprising:
    at least one force sensor;
    an automatically determined excess force threshold value that is determined during the normal mode of operation;
    a movable barrier obstacle detector that is at least partially responsive to the at least one force sensor and to at least one automatically determined excess force threshold value;
    a motor controller operably coupled and responsive to the movable barrier obstacle detector;
        an automatic characteristic force value indicator responsive to the at least one force sensor and having a characteristic force value output that is substantially dependent on a difference between at least one previous characteristic force value output and a substantially present force value that is based, at least in part, on the at least one force sensor, and wherein the at least one automatically determined excess force threshold value is based, at least in part, on the characteristic force value output.

4. A movable barrier operator having a user-selectable learning mode of operation and a normal mode of operation for use with a movable barrier, which movable barrier is selectively moved through selective application of force via the movable barrier operator, the movable barrier operator comprising:
- at least one force sensor;
- an automatically determined excess force threshold value that is determined during the normal mode of operation;
- a movable barrier obstacle detector that is at least partially responsive to the at least one force sensor and to at least one automatically determined excess force threshold value;
- a motor controller operably coupled and responsive to the movable barrier obstacle detector;
- a motor on-time sensor and wherein the automatically determined excess force threshold value further comprises an automatically determined motor on-time-compensated excess force threshold value.

5. A movable barrier operator having both a user-initiable dedicated learning mode of operation and a normal mode of operation for use with a movable barrier, which movable barrier is selectively moved through selective application of force via the movable barrier operator, the movable barrier operator comprising:
- at least one force sensor;
- a movable barrier obstacle detector that is at least partially responsive to the at least one force sensor and to at least one automatically determined excess force threshold value that is at least partially determined during the normal mode of operation;
- a motor controller operably coupled and responsive to the movable barrier obstacle detector;
- an automatic characteristic force value indicator responsive to the at least one force sensor and having a characteristic force value output that is substantially dependent on a difference between at least one previous characteristic force value output as provided during a previous normal mode of operation and a substantially present force value that is based, at least in part, on the at least one force sensor, and wherein the at least one automatically determined excess force threshold value is based, at least in part, on the characteristic force value output.

6. A movable barrier operator having both a user-initiable dedicated learning mode of operation and a normal mode of operation for use with a movable barrier, which movable barrier is selectively moved through selective application of force via the movable barrier operator, the movable barrier operator comprising:
- at least one force sensor;
- a movable barrier obstacle detector that is at least partially responsive to the at least one force sensor and to at least one automatically determined excess force threshold value that is at least partially determined during the normal mode of operation;
- a motor controller operably coupled and responsive to the movable barrier obstacle detector;
- a motor on-time sensor and wherein the at least one automatically determined excess force threshold value comprises an automatically determined motor on-time-compensated excess force threshold value.

7. A movable barrier operator for use with a movable barrier, which movable barrier is selectively moved through selective application of force via the movable barrier operator, the movable barrier operator comprising:
- at least one force sensor;
- an automatic characteristic force value indicator responsive to the at least one force sensor and having a characteristic force value output;
- a movable barrier obstacle detector that is at least partially responsive to the at least one force sensor and to the characteristic force value output; and
- a motor controller operably coupled and responsive to the movable barrier obstacle detector;

wherein the characteristic force value output is substantially dependent on a difference between at least one previous characteristic force value output and a more current force value that is based, at least in part, on the at least one force sensor.

8. The movable barrier operator of claim 7 wherein the characteristic force value output remains substantially unchanged when the difference does not exceed a minimum predetermined range.

9. The movable barrier operator of claim 7 wherein the characteristic force value output substantially comprises the more current force value when the difference is within a first predetermined range, and substantially comprises a previous characteristic force value output as combined with a predetermined amount when the difference is outside the first predetermined range.

10. The movable barrier operator of claim 7 wherein the characteristic force value output is substantially dependent on a difference between at least one previous characteristic force value output and a more current force value pursuant to a first function when the difference has a first sign and is substantially dependent on a difference between at least one previous characteristic force value output and a more current force value pursuant to a second function, which second function is different than the first function, when the difference has a sign that is opposite of the first sign.

11. The movable barrier operator of claim 7 and further comprising a motor on-time sensor and wherein the automatic characteristic force value indicator is further responsive to the motor on-time sensor and wherein the characteristic force value output comprises a motor on-time-compensated characteristic force value output.

12. A movable barrier operator for use with a movable barrier, which movable barrier is selectively moved through selective application of force via the movable barrier operator, the movable barrier operator comprising:
- at least one force sensor;
- an automatic characteristic force value indicator responsive to the at least one force sensor and having a characteristic force value output, wherein the automatic characteristic force value indicator includes a characteristic force value updater responsive to a substantially current force measurement and to a substantially current characteristic force value, with the characteristic force value updater having an updated characteristic force value output substantially comprising one of:
  - the substantially current force measurement when a first condition is met; and
  - a value that is different than the substantially current force measurement and different than the substantially current characteristic force value when a second condition is met;
- an automatic excess force threshold value indicator responsive to the characteristic force value output and having an excess force threshold value output;

a movable barrier obstacle detector that is at least partially responsive to at least one force sensor and to the excess force threshold value output; and a motor controller operably coupled and responsive to the movable barrier obstacle detector.

13. The movable barrier operator of claim 12 wherein the first condition comprises a substantially current force measurement that exceeds a first predetermined threshold.

14. The movable barrier operator of claim 13 wherein the second condition comprises a substantially current force measurement that is less than the first predetermined threshold.

15. The movable barrier operator of claim 12 wherein the value that is different than the substantially current force measurement and different than the substantially current characteristic force value at least partially comprises the substantially current force measurement as combined with a predetermined value.

16. The movable barrier operator of claim 12 and further comprising at least one temperature sensor, wherein the characteristic force value updater is response to the at least one temperature sensor, and wherein the characteristic force value updater has an updated characteristic force value output substantially comprising one of:

the substantially current force measurement when the first condition is met; and a value that is different than the substantially current force measurement and different than the substantially current characteristic force value when a second condition is met, except when a present temperature is substantially different in a predetermined way than a previously measured temperature, in which case the updated characteristic force value output substantially comprises the substantially current force measurement.

17. The movable barrier operator of claim 16 wherein the predetermined way comprises a present temperature being substantially less than the previously measured temperature.

18. A movable barrier operator for use with a movable barrier, which movable barrier is selectively moved through selective application of force via the movable barrier operator, the movable barrier operator comprising:

at least one force sensor;

an automatic characteristic force value indicator responsive to the at least one force sensor and having a characteristic force value output, wherein the automatic characteristic force value indicator includes a characteristic force value updater responsive to a current force measurement and to a current characteristic force value, with the characteristic force value updater having an updated characteristic force value output substantially comprising one of:

an increased value determined pursuant to a first determination process when the current force measurement is greater than the current characteristic force value; and a decreased value determined pursuant to a second determination process, which second determination process is different from the first determination process, when the current force measurement is less than the current characteristic force value;

an automatic excess force threshold value indicator responsive to the characteristic force value output and having an excess force threshold value output;

a movable barrier obstacle detector that is at least partially responsive to at least one force sensor and to the excess force threshold value output; and a motor controller operably coupled and responsive to the movable barrier obstacle detector.

19. The movable barrier operator of claim 18 and further comprising a first threshold and a second threshold, and wherein the characteristic force value updater is further responsive to the first threshold and the second threshold.

20. The movable barrier operator of claim 19 wherein the first determination process comprises:

using the current force measurement as an updated characteristic force value when the current force measurement exceeds the first threshold; and using a value that results from increasing the current characteristic force value by a first predetermined step value when the current force measurement exceeds the current characteristic force value but is less than the first threshold.

21. The movable barrier operator of claim 20 wherein the second determination process comprises:

using a value that results from decreasing the current characteristic force value by a second predetermined step value, which second predetermined step value is less than the first predetermined step value, when the current force measurement is less than the second threshold.

22. A movable barrier operator for use with a movable barrier, comprising:

at least one sensor to sense a parameter that corresponds to force as is indicated by the sensor to be applied to at least attempt to move the movable barrier;

a plurality of characteristic force values that have been at least partially determined as a function of a calculated curve fit between at least two sensed values of the parameter;

an obstacle detector responsive to the at least one sensor and, with respect to at least one of time and position of the movable barrier, to the plurality of characteristic force values, and having an obstacle detected output that corresponds to an indicated application of excess force to the movable barrier.

23. The movable barrier operator of claim 22 wherein the at least two sensed values of the parameter comprise relative peak values of the parameter.

24. The movable barrier operator of claim 22 wherein the calculated curve fit is selected from amongst a plurality of candidate curve fits.

25. A movable barrier operator for use with a movable barrier, comprising:

at least one sensor to sense a parameter that corresponds to force as is indicated by the sensor to be applied to at least attempt to move the movable barrier;

a plurality of characteristic force values that have been at least partially determined as a function of a calculated curve fit between a first and second parameter value, wherein the first and second parameter values represent parameter values on either side of when the parameter tends to exhibit substantial resonance;

an obstacle detector responsive to the at least one sensor and, with respect to at least one of time and position of the movable barrier, to the plurality of characteristic force values, and having an obstacle detected output that corresponds to an indicated application of excess force to the movable barrier.

* * * * *

UNITED STATES PATENT AND TRADEMARK OFFICE
CERTIFICATE OF CORRECTION

| | | |
|---|---|---|
| PATENT NO. | : 7,679,301 B2 | Page 1 of 1 |
| APPLICATION NO. | : 12/040574 | |
| DATED | : March 16, 2010 | |
| INVENTOR(S) | : Eric M. Gregori et al. | |

It is certified that error appears in the above-identified patent and that said Letters Patent is hereby corrected as shown below:

IN THE SPECIFICATION:

Column 1, Lines 9-11; Please replace paragraph with the following:

-- This is a division of and claims the benefit of prior Application No. 10/971,303 filed October 22, 2004, (now U.S. Patent No. 7,339,336) which claims the benefit of Application Number 10/335,199 (now U.S. Patent No. 6,870,334), filed December 31, 2002, both disclosures of which are hereby incorporated herein by reference in their entirety. --

Signed and Sealed this

Twentieth Day of July, 2010

David J. Kappos
*Director of the United States Patent and Trademark Office*